United States Patent
Horiuchi et al.

(10) Patent No.: US 8,390,568 B2
(45) Date of Patent: Mar. 5, 2013

(54) DISPLAY SYSTEM

(75) Inventors: Takao Horiuchi, Nara (JP); Takahisa Sato, Nara (JP); Masashi Toyoda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1208 days.

(21) Appl. No.: 12/283,325

(22) Filed: Sep. 11, 2008

(65) Prior Publication Data

US 2009/0073116 A1    Mar. 19, 2009

(30) Foreign Application Priority Data

Sep. 13, 2007  (JP) ................. 2007-238138

(51) Int. Cl.
  *G06F 3/033* (2006.01)
  *G09G 5/08* (2006.01)
(52) U.S. Cl. ......... 345/157; 345/156; 345/158; 701/213
(58) Field of Classification Search ........... 345/156–172
  See application file for complete search history.

(56) References Cited

U.S. PATENT DOCUMENTS

| | | | | |
|---|---|---|---|---|
| 6,698,897 B2* | 3/2004 | Hamana et al. | ................. | 353/42 |
| 2006/0241864 A1* | 10/2006 | Rosenberg | ................. | 701/213 |
| 2008/0012824 A1* | 1/2008 | Grunnet-Jepsen et al. | ... | 345/156 |
| 2009/0021480 A1* | 1/2009 | Tagawa | ................. | 345/158 |

FOREIGN PATENT DOCUMENTS

| | | |
|---|---|---|
| JP | 04-371063 | 12/1992 |
| JP | 2001-306253 | 11/2001 |
| JP | 2002-244813 | 8/2002 |
| JP | 2006-302046 | 11/2006 |

\* cited by examiner

*Primary Examiner* — Kevin M Nguyen
*Assistant Examiner* — Kenneth B Lee, Jr.
(74) *Attorney, Agent, or Firm* — Edwards Wildman Palmer LLP; George W. Neuner

(57) ABSTRACT

A display system has a display device, a display control device, and a laser emitting device. The display device has a display part that displays information on a display screen and a laser detection part having a plurality of optical sensors arranged in the vicinity of the display screen of the display part to detect a laser beam that has reached the display screen. The laser emitting device has an instruction input part that inputs an instruction with respect to the displayed information and a laser output part that outputs the laser beam including output information corresponding to the inputted instruction. The display control device has a position calculation part that calculates a position of the display screen irradiated with the laser beam based on positions of the optical sensors that have detected the laser beam, a received information acquiring part that acquires the output information included in the laser beam detected by the optical sensors and a display control part that controls a display of the information displayed on the display part, based on the position calculated by the position calculation part and the acquired output information.

8 Claims, 17 Drawing Sheets

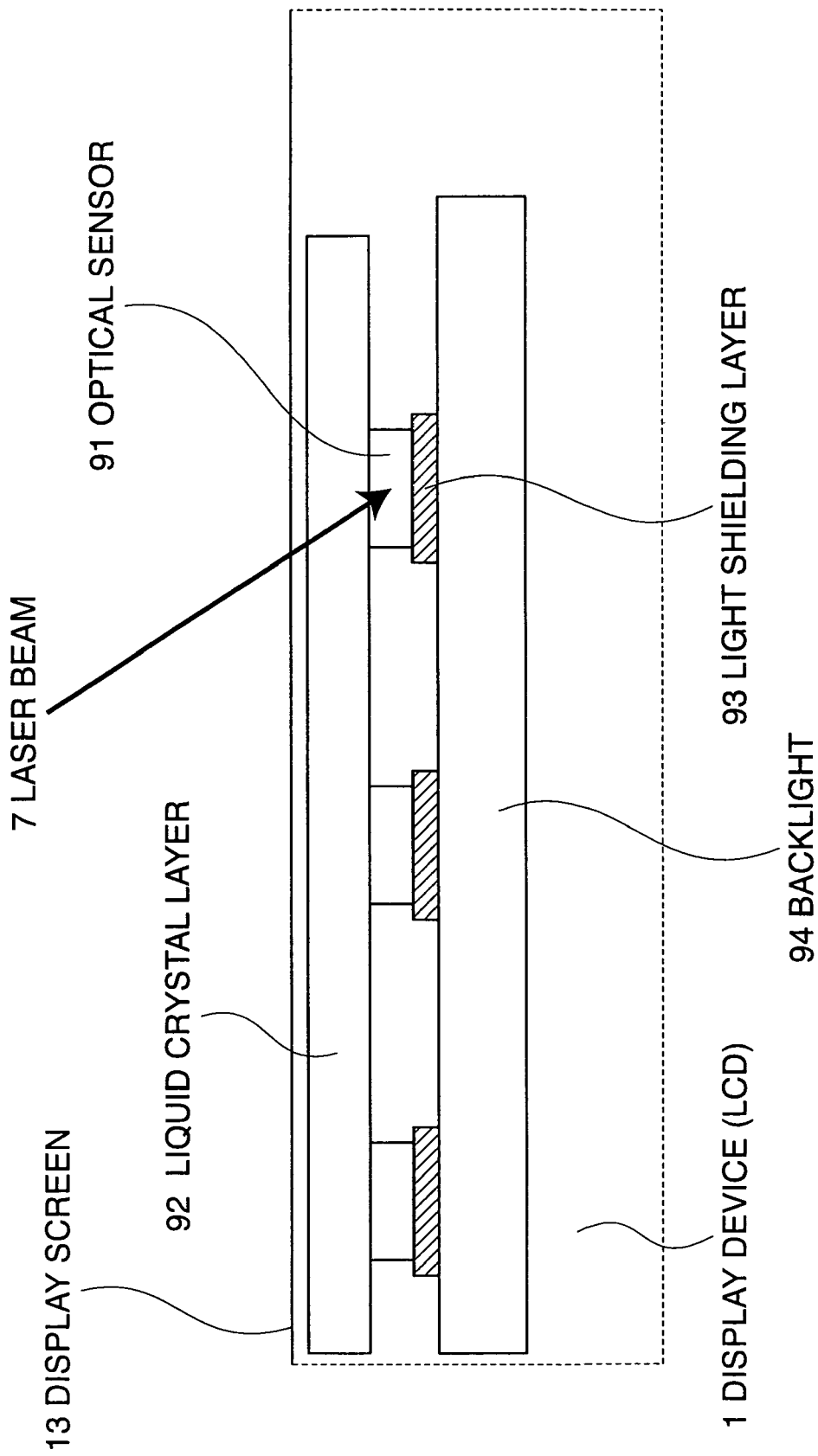

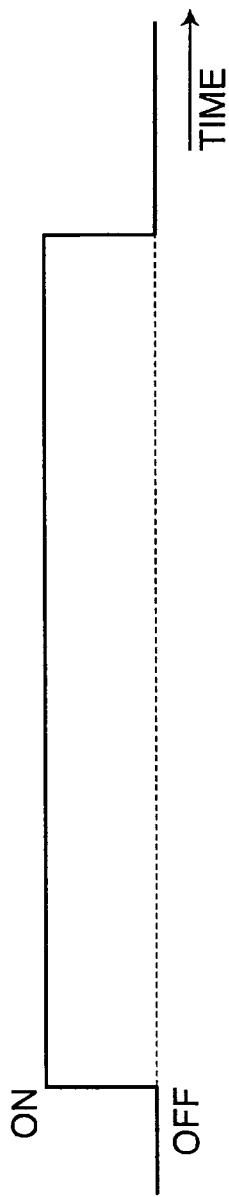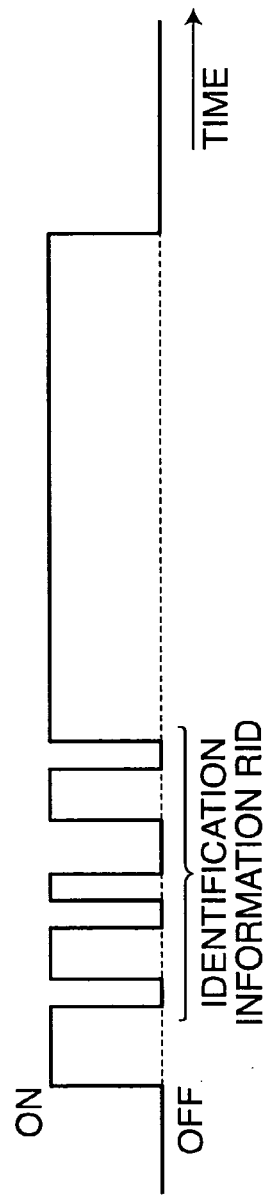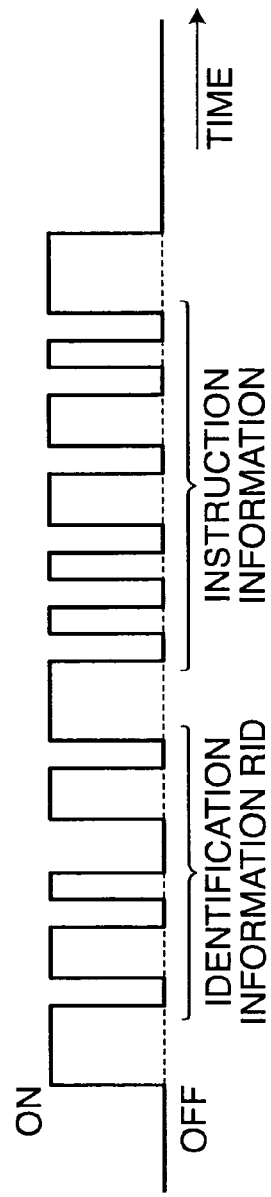

FIG.7

EXAMPLE OF FILE INFORMATION 31

| FILE NAME FN | AUTHENTICATION INFORMATION FID | APPLICATION NAME APN | FILE CONTENT |
|---|---|---|---|
| FL001 | FID1111 | APR-aaa | CONTENT OF FL001 |
| FL002 | FID2222 | APR-bbb | CONTENT OF FL002 |
| FL003 | FID8888 | APR-ccc | CONTENT OF FL003 |
| ...... | ...... | ...... | ...... |
| FL00n | FID3333 | APR-nnn | CONTENT OF FL00n |

35

| APPLICATION PROGRAM |
|---|
| APR-aaa |
| APR-bbb |
| APR-ccc |
| ... |
| APR-nnn |

33

| RECEIVED INFORMATION | IDENTIFICATION INFORMATION RID | ID1111 |
|---|---|---|
| | INSTRUCTION INFORMATION | RQK02 |

36

| USER INFORMATION MID |
|---|
| ID1111 |

RECEIVABLE INSTRUCTION INFORMATION (REGISTERED DATA)

| INSTRUCTION INFORMATION 48 | INSTRUCTION CONTENT |
|---|---|
| RQK01 | APPLICATION EXECUTING INSTRUCTION |
| RQK02 | MENU LIST DISPLAY INSTRUCTION |
| RQK03 | UPPER SCROLL INSTRUCTION |
| RQK04 | LOWER SCROLL INSTRUCTION |
| RQK05 | BLACK PEN MODE SWITCHING INSTRUCTION |
| RQK06 | RED PEN MODE SWITCHING INSTRUCTION |
| RQK07 | PEN MODE RELEASE INSTRUCTION |

EXAMPLE OF DEVICE INFORMATION

DISPLAY SYSTEM

CROSS-REFERENCE TO RELATED APPLICATION

This application is related to Japanese Patent Application No. 2007-238138 filed on Sep. 13, 2007, whose priority is claimed and the disclosure of which is incorporated by reference in its entirety.

BACKGROUND OF THE INVENTION

1. Field of the Invention

The present invention relates to a display system, and particularly relates to the display system capable of giving an instruction of a position on a display screen and inputting information such as authentication information.

2. Description of the Related Art

Conventionally, a conference and a presentation in which many persons are present proceeds in such a manner that an OHP (over head projector) is used, and a file stored in a personal computer, etc, is projected on a screen via a projector, for explaining a document.

In addition, Japanese unexamined Patent Publication No. HEI4 (1992)-371063 (Japanese document D1) proposes an image display device in which sensors for sensing laser beams are arrayed in a matrix on the screen on which an explanatory material is projected, and a coordinate position on the screen irradiated with laser beams radiated from a laser pointer is detected by the sensors in order to give an effective instruction and an explanation for the document displayed on the screen.

In the conference using the aforementioned image display device and projector, the screen for projecting the document is a large screen, and is set at a place apart from a position of a demonstrator in many cases.

In the above-described Japanese document D1, when the demonstrator points a specific position on the screen by the laser beams radiated from the laser pointer, coordinates of the pointed position are detected, and a symbol M shown by arrow is displayed at this point position, thus making it possible to effectively specify a place desired to be explained by the demonstrator.

However, when there is a plurality of sheets of explanatory material, switching operation of pages is necessary with a mouse, etc, while viewing the screen such as a personal computer, etc, different from the screen.

In addition, when the next document is stored as another file on the personal computer, an operation is necessary such as retrieving this file and opening it on the personal computer.

Further, in recent years, from a viewpoint of preventing unauthorized access to the file, authentication processing is performed, in which a person accessible to this file is specified, and for example password, etc, is provided for each file, and only when a correct password is inputted, this file can be read and rewritten. In the authentication processing, generally, a particular input operation must be performed by the demonstrator, such as inputting an ID code for specifying an individual person in addition to input of the password.

However, in the conference and the presentation, when such the authentication processing is performed every time another file is read, speedy progress of the conference is impossible.

In addition, in order to realize a smooth progress of the presentation, a plurality of files on which security is applied must be read immediately, for the explanatory material displayed on the screen. However, a particular preparation work must be performed in advance by the demonstrator, such as previously performing security release processing in which authentication by password becomes unnecessary.

Further, when it is desired to emphasize an important item or new writing at a time of explaining for the explanatory material displayed on the screen, emphasis and write processing must be performed on a screen of the same explanatory material displayed on the personal computer, etc with a mouse, keyboard or the like, in addition to instructing operation on the screen with the laser pointer.

Accordingly, in the conference and the presentation, it is sometimes necessary to perform authentication operation for opening a new file and particular input operation for explanation, in addition to the instructing operation on the screen. Therefore, an operation load of the demonstrator becomes large, thus interfering with the smooth progress of the presentation in some cases.

SUMMARY OF THE INVENTION

The present invention is a display system capable of giving an instruction of a display position on a screen and inputting information for authentication processing only by giving instruction input with a laser pointer by a demonstrator.

This invention is to provide a display system comprising a display device, a display control device and a laser emitting device, the display device including: a display part that displays information on a display screen; and a laser detection part having a plurality of optical sensors arranged in the vicinity of the display screen of the display part to detect a laser beam that has reached the display screen, the laser emitting device including: an instruction input part that inputs an instruction with respect to the displayed information; and a laser output part that outputs the laser beam including output information corresponding to the inputted instruction, the display control device including: a position calculation part that calculates a position of the display screen irradiated with the laser beam based on positions of the optical sensors that have detected the laser beam; a received information acquiring part that acquires the output information included in the laser beam detected by the optical sensors; and a display control part that controls a display of the information displayed on the display part, based on the position calculated by the position calculation part and the acquired output information.

According to this structure, the output information is included in the laser beams emitted to the display screen. Therefore, a user can easily perform display control to display information only by operating a laser emitting device that emits laser beams, while he keeps to viewing the display screen. Thus the invention make it possible to more reduce an operation load of the user than that of a system in which operation for the display control is necessary in addition to the irradiation operation of the laser beams. Therefore operability of the user is improved in the conference, etc, and the conference, can smoothly proceed.

BRIEF DESCRIPTION OF THE DRAWINGS

FIG. 4 is an explanatory view of a structure of the display device according to an example of this invention;

FIGS. 5A to 5C are an explanatory view of an electric signal outputted from optical sensors according to an example of this invention;

FIG. 7 is an explanatory view of file information, etc, according to an example of this invention;

FIG. 8 is an explanatory view of instruction information used in an example of this invention;

DETAILED DESCRIPTION OF THE INVENTION

Figure 1:
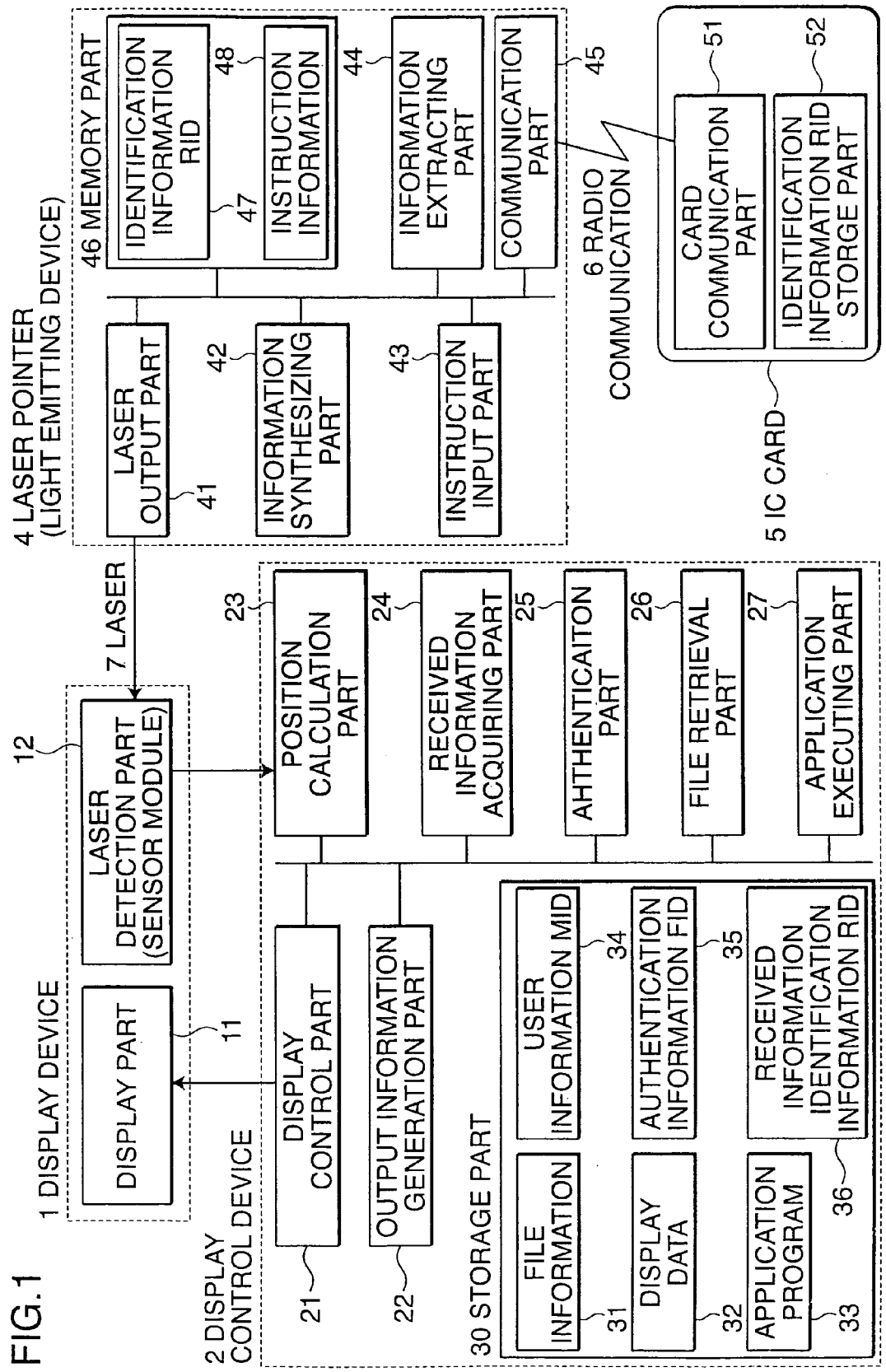
FIG. 1 is a block diagram according to an example of a display system of this invention.

This invention provides the display system wherein the output information included in the laser beam is identification information for identifying a user, and the display control device further includes: a storage part that previously stores user information for identifying a person authorized to use the display system; and an authentication part that performs authentication of the user by comparing the output information acquired by the received information acquiring part with the previously stored user information.

According to this structure, the identification information is included in the laser beams for identifying the user, the user can easily and speedily perform authentication processing only by operating the laser emitting device that emits laser beams, without performing another authentication processing including a particular operation for confirming whether or not the user is authorized to utilize the system of the present invention.

Further, in this invention, the instruction input part includes a plurality of keys, and the output information included in the laser beam is instruction information corresponding to a function associated with each key, and when any one of the keys is depressed, the laser output part outputs the laser beam including the instruction information associated with this key.

According to this structure, the laser beams are outputted, with the laser beams including the instruction information corresponding to the function associated with the key. Therefore, it is enough only to operate the key formed in the laser emitting device for emitting laser beams, while keeping to view the display screen, and this makes it possible to reduce the operation load of the user.

The display system further includes an IC card that stores identification information RID in advance for identifying a user, and the laser emitting device includes a communication part that reads the identification information RID stored in the IC card by performing communication with the IC card, wherein the identification information RID read from the IC card is used in the output information included in the laser beam.

According to this structure, it is not necessary to previously store the identification information in the laser emitting device, and in a case of the user who is authorized to utilize the system of the present invention, by possessing an IC card and making a prescribed communication performed between the IC card and a communication part, the display system of the present invention can be easily used.

Herein, the IC card may be a non-contact type card that performs radio communication with the communication part.

According to this structure, the identification information is transmitted from the IC card to the laser emitting device by radio communication. Therefore, only by making the IC card approach to the laser emitting device, the display system of the present invention can be more easily and speedily used.

In addition, since the identification information important on security is not previously stored in the laser emitting device, a sufficient security can be secured even when the laser emitting device is lost or stolen, and only by sufficiently managing the one's self IC card by the user, the security can be improved.

Further, this invention provides the display system, wherein the output information includes identification information for identifying a user and instruction information corresponding to instruction content inputted by the instruction input part, the display control device further includes: a storage part that previously stores user information for specifying a person authorized to use the display system; an authentication part that performs authentication of the user by comparing the identification information for specifying the user out of the output information acquired by the received information acquiring part with the previously stored user information, and the display control part controls a display of the information displayed on a display part based on a position calculated by the position calculation part and the instruction information out of the acquired output information.

According to this structure, the identification information and the instruction information are included in the laser beams. Therefore, only by performing the irradiation operation of the laser beams by the user while viewing the display screen, the authentication information and the display control processing based on the instruction information can be easily and speedily performed.

In addition, in the conference where general public persons, whose secrecy obligation is not necessary, are present, the progress of the conference and the presentation can smoothly proceed, while sufficiently confirming the security of the information to be visible to participants.

Further, this invention provides the display system, wherein when the laser beam is emitted from the laser output part toward a specific icon, in a state of displaying the icon associated with one or a plurality of operation objects, after the laser beam is detected by optical sensors arranged at a position corresponding to a display area of the specific icon, the operation object corresponding to the icon irradiated with the laser beam from the position of the optical sensors calculated by the position calculation part is recognized, instruction content for this operation object is recognized from the output information acquired by the received information acquiring part, and the display control part performs display control of the recognized operation object based on the recognized instruction content.

Herein, the operation object means any one of a file in which information is stored, a device, or an application program.

According to this structure, only by performing irradiation operation of the laser beam to a specific position on the display screen by the user, the display control can be easily performed to an operation object associated with a displayed icon.

Further, this invention provides the display system, wherein the instruction information included in the laser beam is pen mode switch instruction information for additionally displaying a desired dot image on a display screen, and the display control part displays the dot image at an irradiation position of the laser beam on a display screen of the display part, when the received information acquiring part acquires pen mode switching instruction information from the laser beam including the instruction information.

When the instruction information included in the laser beam is the pen mode release instruction information for deleting an added dot image, the display control part deletes the dot image additionally displayed on the display screen.

According to this structure, only by performing operation by the user with the laser emitting device, while viewing the display screen, display of an additional dot image or cancel of display can be easily performed on the display screen.

In this invention, the laser emitting device further includes a holding state detection part for detecting whether or not this laser emitting device is held by a user, and when a change of a holding state is detected by the holding state detection part from a non-holding state to a holding state, the communication part transmits to an IC card a transmission request of the identification information RID for identifying a user stored in the IC card.

Thus, identification information RID of the IC card can be surely acquired, and by preventing acquisition of incorrect identification information RID, it is possible to prevent the display of the file that can not be referenced by the user.

Further, in this invention, the laser emitting device further includes a vibration element, and when the identification information RID stored in the IC card can not be acquired by communicating with the IC card, the vibration element is vibrated.

Thus, only the user of the laser emitting device can be known that the identification information RID of the IC card is not acquired, without letting no one excluding the user know about it.

Preferred embodiments of the present invention will be explained with the drawings. Note that the present invention is not limited by the description of the examples hereunder.

<Structure of a Display System of this Invention>

FIG. 1 shows a block diagram of a structure of a display system of this invention.

The display system of this invention mainly includes a display device 1, a display control device 2, a light emitting device 4, and an IC card 5.

The display device 1 includes a display part 11 displaying information, and for example, can use an LCD and a PDP. In addition, a screen that projects an image of light emitted from a slide or a projector can also be used. Explanatory materials (such as document, drawings, graph, etc) used in a conference and a presentation can be given as displayed information. In addition, the display device 1 includes a laser detection part 12 in addition to the display part 11 that displays information.

The laser detection part 12 is a sensor module that receives laser beam 7 emitted from the light emitting device 4, and arrays a plurality of optical sensors for converting the laser beams into an electric signal in a matrix. A sensor module 12 is provided so as to close to and in parallel to a display screen of the display part 11.

When the laser beam 7 is emitted to the display screen, the laser beam 7 is detected by the optical sensors arrayed corresponding to a screen position irradiated with the laser beam. Then, by recognizing a position of the optical sensors where the laser beam 7 is detected, the coordinates on the display screen irradiated with the laser beam (X-coordinate, Y-coordinate) are calculated by a position calculation part 23 as will be described later.

When the display part 11 is the LCD, the sensor module 12 is provided between a liquid crystal layer and a backlight plate. The sensor module 12 is constituted of a plurality of optical sensors arrayed in a matrix on a X-Y coordinate plane, at regular intervals. The position of each optical sensor on the X-Y coordinate plane is calculated from an electric signal Sx for specifying the X-coordinate and an electric signal Sy for specifying the Y-coordinate generated at a time of emitting the laser beam. In addition, when the LCD is used in the display part 11, a minute light shielding layer is formed between the optical sensors and the backlight so that light from the backlight is not directly made incident on the optical sensors.

When the display part 11 is a screen, the sensor module 12 is provided on the screen surface.

In FIG. 1, the display control device 2 mainly includes a display control part 21, an output information generation part 22, a position calculation part 23, a received information acquiring part 24, an authentication part 25, a file retrieval part 26, an application executing part 27, and a storage part 30.

The display control device 2 is mainly realized by a micro computer which includes a CPU, a ROM, a RAM, an I/O control part, a timer, and a graphic control part (LSI), etc, and various functions of the display control device 2 are realized by operating each kind of hardware by the CPU, based on the control program stored in the ROM, etc.

The display control part 21 is a part for outputting displayed information to the display part 11.

The output information generation part 22 is a part that generates the information displayed on the display part 11, and is a part, for example, that reads file information 31 previously stored in the storage part 30, and converts the file information 31 into data of a format that can be displayed on the display part 11, and transfers the data after conversion to the display control part 21.

The position calculation part 23 is a part that receives electric signals (Sx and Sy) from the laser detection part (sensor module), and calculates the X-Y coordinates on the display screen irradiated with the laser beams from the electric signals.

The received information acquiring part 24 is a part that extracts the information included in the laser beam 7 received by the optical sensors. For example, when identification information (RID) 47 for specifying a user is superposed on the laser beam 7 emitted from the laser output part 41, the identification information (RID) 47 is extracted by detecting the change of amplitude and frequency of the laser beam received at a superposed part, or the number of the switching and timing of ON and OFF of this part.

The information included in the laser beam 7 includes the information of each kind of instruction input such as a menu display instruction, a file selecting instruction, an executing instruction of an application, a scroll instruction, a pen input instruction, in addition to the identification information (RID) 47.

Such an instruction input can be performed by depressing a specific function key attached to the light emitting device 4.

The information acquired by the received information acquiring part 24 is stored in the storage part 30 as received information 36.

The authentication part 25 is a part that checks whether or not the person using this display system is an authorized person. For example, this is a part whether or not identification information RID47 of the received information 36 received by the laser detection part 12 and user information MID34 previously stored in the storage part 30 coincides with each other. In a case of coincidence of them, the authentication is regarded as a success, and processing thereafter (such as file selection processing) is executed.

In addition, as will be described later, the authentication part 25 checks whether or not authentication information FID35 attached for every file and the received identification information RID47 coincides with each other.

The file retrieval part 26 is a part that reads the selected file from the file information 31 previously stored in the storage part 30.

The application executing part 27 is a part that activates a selected application program.

For example, for the file read by the file retrieval part 26, the application executing part 27 activates the application program associated with this file, then opens the file whose application program is read, and displays content of this file on the display part 11.

The storage part 30 is a nonvolatile semiconductor recording element or a storage medium, etc, and is a part that stores various pieces of information used in this display system.

The storage part 30 stores, for example, file information 31, display data 32, an application program 33, user information MID34, authentication information FID35, and received information 36, etc.

The file information 31 includes, for example, the explanatory materials such as documents, figures, graphs, still/moving images, etc, for the presentation.

The display data 32 is data to be displayed on the display part 11, and includes, for example, menu list data (file list) for selecting the displayed file.

The application program 33 means, for example, a document creating program, an image editing and a reproduction program, etc.

The user information MID34 means information for specifying the person authorized to use the display system of this invention, corresponding to one of the authentication information compared in the authentication part 25. For example, an ID code of a company who possesses this display system of this invention or a member of a department who manages this display system of this invention, or individual information such as a name, correspond to the user information MID34.

The authentication information FID35 is information attached to individual every file, and means, for example, information for specifying the person authorized to access this file.

In addition, the authentication information FID35 is one of two pieces of information compared when performing authentication processing of the file desired to be used by the authentication part 25, and is for example information for specifying the person who creates the file and information for specifying the person authorized to read this file.

The received information 36 is information acquired by the received information acquiring part 24, and is information included in the laser beam detected by the laser detection part 12.

For example, as described above, the identification information RID47 is one of the received information 36, and one of information compared by the authentication part 25.

The function of each function block of the above-described display control device 2 is realized by organically operating each hardware by CPU, based on the control program previously stored mainly in the ROM, etc.

The light emitting device (laser pointer) 4 is a part that outputs the laser beam 7.

The user emits the laser beam 7 outputted from the laser pointer 4 toward the display part 11, and by a spot on the display screen irradiated with the laser beam 7, a particular portion of the information displayed on the display part 11 is indicated.

The laser beam 7 is detected by the optical sensors at a position indicated by the spot of the laser beam 7, and by electric signals of the X-coordinate and the Y-coordinate specifying this position, the position indicated by the user is calculated.

The laser pointer 4 is mainly realized by the laser output part 41, an information synthesizing part 42, an instruction input part 43, a memory part 46, an information extracting part 44, and a communication part 45. These function blocks are realized by a microcomputer mainly including the CPU, ROM, RAM, I/O control part, a communication LSI, and a timer.

The laser output part 41 is a part that emits the laser beam 7, and for example a laser diode is used in this part.

The laser beam 7 is the light having a wavelength of, for example, 650 nm or 532 nm and the laser beam is modulated by the laser output part 41 at a time of emission, to include the information synthesized by the information synthesizing part 42.

The information synthesizing part 42 is a part that synthesizes output information included in the laser beam to give the laser output part 41 the output instruction signal so as to output modulated laser light corresponding to the output information. The synthesized output information includes instruction information 48 corresponding to the instruction inputted by the instruction input part 43 and the identification information RID47 stored in the memory part 46.

The instruction input part 43 is a part for inputting the instruction given to the display control device 2, and corresponds to the function key formed in the laser pointer 4. The laser pointer 4 is provided with a plurality of function keys such as an output key of the laser beam, a menu list display key for a file, etc, and a scroll key (see FIG. 6).

For example, when the output key of the laser beam is depressed, the instruction input part 43 recognizes which key is depressed, so that a request signal for outputting the laser beam is transferred to the information synthesizing part 42.

The information synthesizing part 42 to which the output request signal of the laser beam is given, reads the identification information RID47 stored in the memory part 46, and generates the output instruction signal so as to synthesize the identification information RID47, which is then given to the laser output part 41. The laser output part 41 outputs the modulated laser beam 7 including the identification information RID47, based on the output instruction signal.

In addition, in a case of depressing the scroll key, the signal showing depression of the scroll key is given to the information synthesizing part 42, and the information synthesizing part 42 reads from the memory part 46 the instruction information 48 corresponding to the scroll key, and generates the output instruction signal for synthesizing the read instruction information 48 into the laser beam 7, which is then given to the laser output part 41.

The memory part 46 is a part that stores the information used by the laser pointer 4, and mainly stores the identification information RID47 and the instruction information 48.

The identification information RID47 is specific information previously stored in the IC card 5, and is information acquired from the IC card 5 by communicating with the IC card 5.

The instruction information 48 is information included in the laser beam 7 and transmitted to the display control device 2, and is information corresponding to the instruction inputted from the instruction input part 43.

For example, if there are seven function keys formed in the laser pointer 4, seven pieces of information corresponding to the inputted instruction at a time of depressing each function key is the instruction information 48.

The instruction information 48 includes a laser beam output instruction, a menu list display instruction, an upper scroll instruction, a lower scroll instruction, a black pen mode switching instruction, a red pen mode switching instruction, a pen mode release (deletion mode) instruction, and an application executing instruction, etc.

Here, the laser beam output instruction means simply the instruction for outputting the laser beam 7, without including the information in the laser beam, and is the instruction information for output start and output stop of the laser beam 7.

When the user depresses the specific function key, and the output instruction meaning the output start of the laser beam is given to the laser output part 41, the laser beam 7 not including the information is outputted from the laser output part 41.

Alternately, when the output instruction meaning the output start of the laser beam 7 is given to the laser output part 41 when the laser beam is set in an output stop state, the identification information RID47 stored in the memory part 46 is read, and the output instruction signal such as outputting the laser beam 7 including the identification information RID47 in addition to the output instruction may be given to the laser output part 41. In this case, when the display control device 2 receives the laser beam 7 for the first time, the authentication processing using the identification information RID47 included in the laser beam is executed.

In addition, after output start of the laser beam 7, if the laser beam is outputted on a steady basis until a stop instruction is given, the laser beam 7 is used for indicating a specific part of the explanatory material displayed in the display part 11.

Further, when the instruction information showing the output stop of the laser beam is given to the laser output part 41, output of the laser beam 7 is stopped. Stop and start of the output of the laser beam may be alternately switched, every time the same laser beam output key is depressed.

In addition, when the laser beam 7 is not always outputted but is outputted for several seconds after depressing the specific key or while the key is depressed, and the output is stopped when the key is taken off, the laser beam including this instruction information 48 is emitted even when only the key input meaning the instruction (such as a menu list display instruction) other than an output instruction of the laser beam is received. Namely, even if not depressing the laser beam output key, the laser diode 41 is controlled so as to emit the laser beam only by depressing other respective function keys.

Further, when a specific function key is depressed in a state of already emitting the laser beam, the laser beam including the instruction information corresponding to this function key may be outputted for a predetermined period of time.

The communication part 45 is a part that communicates with the IC card 5.

The IC card 5 may be a contact type card that is inserted into the laser pointer 4 to communicate with the laser pointer 4. However, in order to improve usability of the user, a non-contact type card is preferably used.

When the non-contact type IC card is used, the communication between the communication part 45 and the IC card 5 is performed by near-distance radio communication such as Bluetooth.

The information extracting part 44 is a part that extracts information from a radio signal received by the communication part 45 and stores it in the memory part 46.

For example, when the identification information RID stored in the IC card 5 is received by the communication part 45, the received identification information RID47 is stored in the memory part 46.

The IC card 5 includes a card communication part 51 and an identification information RID storage part 52, and communicates with the communication part 45 of the laser pointer 4 is performed.

When the IC card 5 is the non-contact type card, the card communication part 51 performs radio communication 6 with the communication part 45 by a defined communication protocol, and previously stored identification information RID, etc, is transmitted to the laser pointer 4.

Information for specifying a possessor of the IC card is previously stored in the identification information RID storage part 52. For example, ID cord specific to the possessor, name, address, and birth date of the possessor, etc, are stored therein.

The identification information RID47 stored in the memory part 46 is information previously stored in the identification information storage part 52 of the IC card, and for example the ID cord of the card possessor can be used.

This identification information RID47 is information compared with the user information MID34 or the authentication information FID35 previously stored in the storage part 30 of the display control device 2.

<Example of a Use Form of the Display System>

Figure 2:
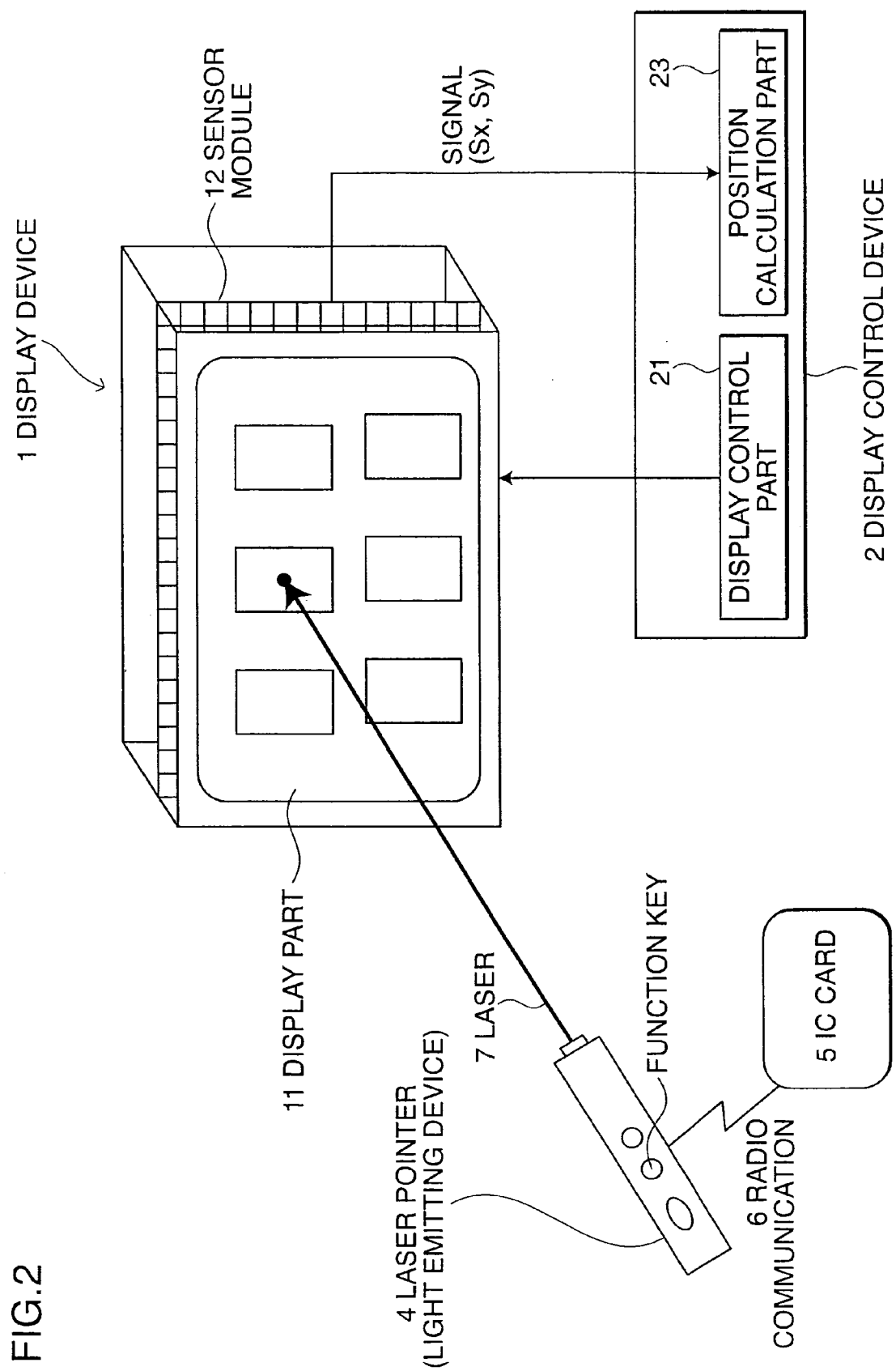
FIG. 2 is an explanatory view of a use form according to an example of the display system of this invention.

FIG. 2 shows a schematic explanatory view of an example of the display system of this invention when using the system.

In FIG. 2, when the IC card 5 having self-identification information RID stored therein is approached to the laser pointer 4 by the user, by radio communication 6, the self-identification information RID47 is read from the IC card 5, transmitted to the laser pointer 4, and stored in the memory part 46.

Thereafter, when the user depresses the specific function key of the laser pointer 4, with the laser pointer 4 directed toward the display part 11, the instruction information 48 corresponding to this function key is synthesized into the laser beam 7, and the laser beam 7 including the instruction information 48 is outputted to the display part 11.

For example, in the case that the laser beam 7 is set in an output stop state, when the output key of the laser beam is depressed, the laser beam 7 including the identification information RID47 is outputted from the laser pointer 4.

Meanwhile, the display device 1 is a structure in which the display part 11 and the sensor module 12 are oppositely disposed, and a image is displayed on the display part 11, by a display signal given from the display control part 21 of the display control device 2.

The sensor module 12 including a plurality of optical sensors arranged in a matrix is provided near the display screen, and the laser beam 7 emitted toward the display screen is detected.

The electric signals (Sx and Sy) are outputted from the optical sensors of a position irradiated with the laser beam 7, and are given to the position calculation part 23 and the received information acquiring part 24. When the instruction information 48 is included in the laser beam 7, this instruction information component is included in an outputted electric signal.

The electric signals are composed of a signal Sx showing the position in an X-axis direction for specifying the position of the optical sensors, and a signal Sy showing the position in a Y-axis direction. By recognizing these two signals (Sx and Sy) by the position calculation part 23, it is found that by which optical sensor, the laser beam 7 is detected.

In addition, in a case of including the signal component corresponding to the instruction information 48 included in the laser beam 7, the received information acquiring part 24 recognizes what kind of instruction information is received, by detecting the change of the amplitude and frequency of this signal component or repetition number of times and timing of ON and OFF, and stores it in the storage part 30 as the received information 36.

Thereafter, based on content of the received information 36, processing corresponding to the instruction input by depressing the function key by a user is executed, by the authentication part 25 and the application executing part 27.

For example, when the received information is the identification information RID47, comparison between the received identification information RID47 and the user information MID 34 previously stored in the storage part 30 is performed by the authentication part 25. When both pieces of information (MID and RID) coincide with each other, the user of the laser pointer 4 is determined to be the person authorized to utilize the system, and processing thereafter is executed by the operation of the user. For example, the following file retrieval and display processing are executed.

When icons of a plurality of files are displayed on the screen of the display part 11, and if the user operates the laser pointer 4 so that the icon of a file F01 desired to be opened is irradiated with the spot of the laser beam 7, and if the user depresses an execution key meaning a display request of content of this file F01, the instruction information 48 meaning the display request of the file is synthesized into the laser beam 7 and is outputted from the laser pointer 4.

When calculating the position of the optical sensor where this laser beam 7 is detected, the position calculation part 23 recognizes that this detected position is a display position of the file F01, since it is previously known what file is displayed on the screen of the detected position. In addition, when the information received by the received information acquiring part 24 is recognized as the instruction information meaning the display request of the file, processing of retrieving the file F01 from the storage part 30 and displaying the file F01 on the display part 11 is executed, along with processing of recognizing the position indicated by the laser pointer as the file F01.

Meanwhile, when both pieces of information (MID and RID) do not coincide with each other, the user of the laser pointer 4 is determined to be the person not authorized to use the system, and processing thereafter is not executed. For example, even if the instruction input operation for the application execution processing is performed, such an instruction input can not be received.

Thus, the user operates the laser pointer 4 while viewing the image displayed on the display screen, and after emitting the laser beam 7 outputted from the laser pointer toward a specific position in this image, performs depressing operation of the function key meaning the display of content of the file at this position, while viewing the displayed image. Thus, the content of the file desired to be displayed by the user can be displayed on the display screen.

Namely, only by performing irradiation of the laser beam by the laser pointer and depressing operation of the function key while viewing the display screen, the user can easily and speedily make a desired file displayed, without requiring a specific key operation on the personal computer by viewing the screen on the personal computer different from the screen on which the image is displayed.

In addition, the laser beam 7 outputted after depressing the function key is outputted with the instruction information 48 and the authentication information 47. Therefore, the user can perform user authentication and instruction input almost simultaneously while viewing the image, without performing a specific operation in addition to key depression.

Accordingly, an operation load of the user (demonstrator) in the conference and the presentation can be reduced, thus making the conference, etc, proceed smoothly.

<Explanation for the Sensor Module and the Electric Signal>

Figure 3:
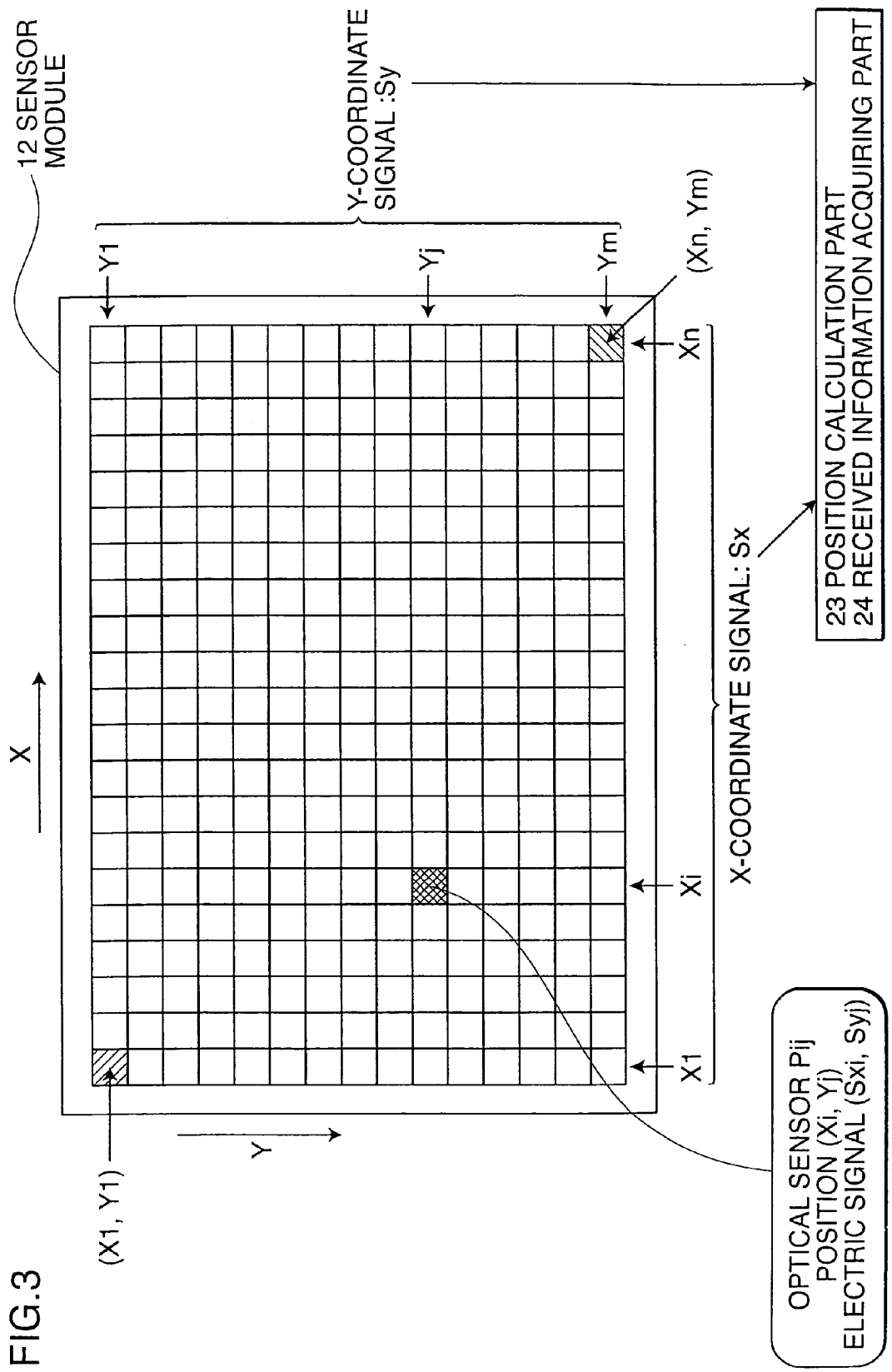
FIG. 3 is an explanatory view of a sensor module of a display device of this invention.

FIG. 3 shows an explanatory view of an example of the sensor module of this invention.

In the sensor module 12, optical sensors Pxy are arrayed in a matrix.

In FIG. 3, n-optical sensors are arrayed in the X-axis (horizontal axis) direction, and m-optical sensors are arrayed in the Y-axis (vertical axis) direction. When the optical sensor Pxy is irradiated with light, an electric signal (Sx, Sy) is generated.

For example, when the optical sensor Pij at a position (Xi, Yj) shown by an X-coordinate Xi and a Y-coordinate Yj is irradiated with the laser beam 7, an electric signal (Sxi, Syj) is generated. The electric signal is composed of a X-coordinate signal Sxi and a Y-coordinate signal Syi, and is outputted to the position calculation part 23 and the received information acquiring part 24.

FIG. 4 shows a schematic explanatory view when the display device 1 is a liquid crystal display device (LCD).

FIG. 4 is a sectional view, showing a part of the LCD.

An LCD 1 mainly includes a liquid crystal layer 92, a backlight 94, an optical sensor 91, and a light shielding layer 93.

The liquid crystal layer 92 is provided near the display screen 13 of the LCD 1, and a minute optical sensor 91 is disposed between the liquid crystal layer 92 and the backlight 94.

The light shielding layer 93 is provided between the optical sensor 91 and the backlight 94 so that the light of the backlight is not received by the optical sensor 91.

As shown in FIG. 4, the laser beam 7 is incident from outside of the display screen of the upper side of this figure, which is then transmitted through the liquid crystal layer 92 and is received by the optical sensor 91.

The laser beam 7 has a sufficient output, and therefore whatever state the liquid crystal layer 92 is set in, the laser beam 7 is transmitted through the liquid crystal layer to reach the sensor module in which the optical sensors are arrayed.

FIGS. 5A to 5C show an explanatory view of an example of the electric signal outputted from the optical sensors shown in FIG. 3.

Here, time is taken on the horizontal axis, and a size of the electric signal is taken on the vertical axis.

FIG. 5A shows the electric signal when the information is not included in the received laser beam 7 and the laser beam 7 is not modulated.

In this case, the electric signal of predetermined amplitude in ON-state is outputted for a predetermined time or continuously. When the user simply indicates the image displayed on the display screen by the laser beam, the laser beam not including information is emitted, and the electric signal (Sx, Sy) shown in FIG. 5A is detected.

FIG. 5B shows an example of the electric signal when the identification information RID47 is included in the received laser beam 7.

In this case, the electric signal is detected as a repetition signal of ON-state and OFF-state corresponding to the identification information RID47.

The received information acquiring part 24 reproduces original identification information RID47, by detecting a condition of a change of the ON-state and OFF-state.

FIG. 5C shows a case of including both of the identification information RID47 and the instruction information 48 in the received laser beam 7.

In FIG. 5C, a former half part of the change of the ON/OFF states shows a case of the identification information RID47, and a latter half part thereof shows a case of the instruction information 48.

A synthesis rule of the information synthesized into the laser beam, namely a rule of the change of the ON-state and the OFF-state is previously defined, and this synthesis rule is stored in the display control device, and by comparing the stored synthesis rule and the outputted electric signal, the two pieces of information (47, 48) can be extracted.

FIG. 5C shows an example of the electric signal when the two pieces of information are included in the laser beam. However, the present invention is not limited thereto.

Three or more pieces of information can also be included, and an order for including such information is no object.

In addition, as described above, the instruction information 48 includes plural kinds of information, and for all of the instruction information having possibility of being received, the pattern of the change of the ON-state and the OFF-state is previously stored in the storage part 30, and by comparing this change pattern and the change pattern of a received electric signal, it is possible to recognize which instruction information 48 is received.

Figure 6:
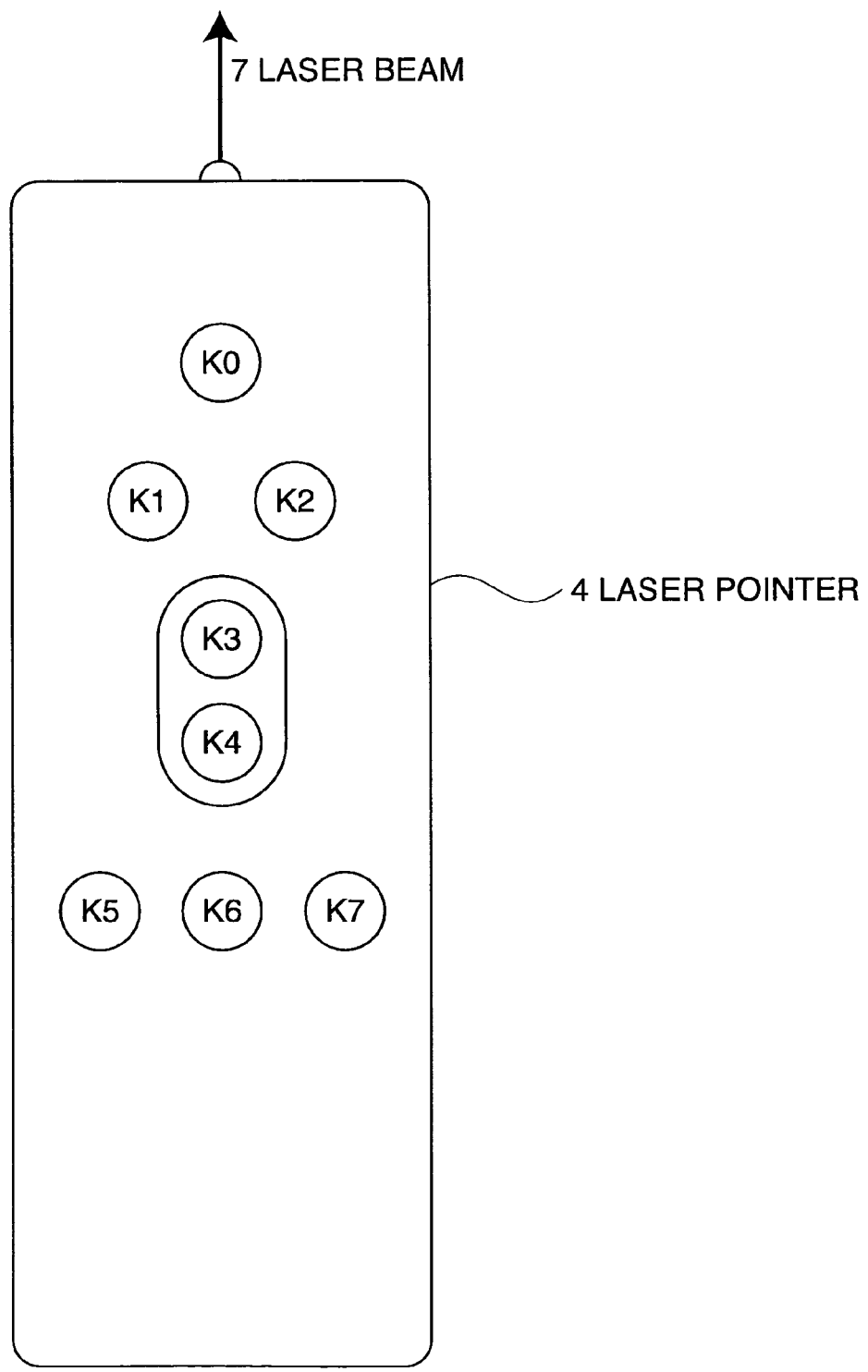
FIG. 6 is an explanatory view of a laser pointer according to an example of this invention.

FIG. 6 shows an example of the function key formed in the laser pointer 4 of this invention.

FIG. 6 shows eight keys (K0 to K7). However, this invention is not limited thereto, and various numbers of keys, arrangements, shapes, etc, can be considered.

Key K0: laser beam output key
Key K1: execution key
Key K2: menu key (menu list display)
Key K3: upper scroll key
Key K4: lower scroll key
Key K5: black pen input mode key
Key K6: red pen input mode key
Key K7: input deletion key The laser beam output key K0 is a key for giving an instruction of start and stop of the output of the laser beam 7. When this key K0 is depressed in a state of already outputting the laser beam 7, the output of the laser beam 7 is stopped. In addition, when this key K0 is depressed in an output stop state of the laser beam, the output of the laser beam 7 is started.

However, when the output start of the laser beam is also performed by depressing the keys K1 to K7, the laser beam output key K0 can be eliminated. Moreover, the laser beam output start key and the laser beam output stop key can be provided separately.

The key K1 is a key for executing the function of a selected function item. For example, when the key K1 is depressed in a case where a file FL001 is displayed at a position on the display screen irradiated with the laser beam 7, such a depressing operation is regarded as an instruction of opening this file FL001, and retrieval and display processing of the file FL001 is executed.

The key K2 is a key for listing and displaying a function item (menu) that can be used by the user, and is a key, for example, corresponding to a right button of a mouse which is frequently used generally.

For example, when the key K2 is depressed, a list of the function item that can be used is displayed.

The function of the selected function item is executed, by depressing the key K2, moving a cursor display and selecting a desired function item with a scroll key (K3 or K4) in a state of displaying the function item, and depressing the execution key K1.

In this case, the instruction information 48 associated with each key is synthesized into the laser beam 7 and is outputted, every time the key K2, key K3, K4 or K1 is depressed.

As will be described later, the keys K5, K6, and K7 are keys used when the mode is switched to the mode of inputting characters and figures with the laser beam 7, so as to be superposed on the image on the display screen.

When the key K5 or the key K6 is depressed, pen mode switching instruction information is synthesized into the laser beam, which is then outputted, and a dot image is displayed at an irradiation position of the laser beam.

FIG. 7 shows an explanatory view of an example of the information stored in the storage part 30.

A nonvolatile recording device or recording medium is used in the storage part 30 as a hard disc.

Here, the file information 31 is mainly constituted of a file name FN, authentication information FID35, an application name APN, and the content of the file.

The authentication information FID35 is information attached to every file, such as an ID number of a creator of this file.

The application name APN is information attached to every file, such as a name of an application program where this file is created.

When an processing of opening the file is performed, the application program activated with this application name APN as a clue is selected. The file content means a substantial material (document and image, etc) specified by this file name FN.

In FIG. 7, for example, the file having the file name FN of "FL001", is created by the application program having the application name APN of "APR-aaa", and "FID1111" is given thereto as the authentication information FID35.

The authentication information FID35 is information compared with the received identification information RID47 in the authentication processing performed when the instruction of opening this file is received.

In addition, as shown in FIG. 7, the storage part 30 also stores the substantial material (APR-aaa and APR-bbb) of the application program 33.

When a certain file is opened, first, the CPU reads the application program 33 associated with this file and develops the read program in a main storage, and thereafter by the operation of this application program, the CPU performs processing of reading this file and displaying it on the display part.

FIG. 7 shows a case in which "ID1111" is stored as the user information MID34. This user information MID is not limited to one, and plural pieces of user information MID of all persons authorized to utilize this display system may be stored. When the plural pieces of user information MID are stored, utilization of this display system thereafter is possible, provided that the received identification information RID47 coincides with any one of the plural pieces of user information MID34.

FIG. 7 shows the identification information RID47 (ID1111) and the instruction information 48(RQK02), as an example of the received information 36.

This example shows a case of receiving two pieces of information, and the "ID1111", being the identification information RID47, is used in the authentication processing. The received instruction information 48 (RQK02) is used for specifying instruction content.

FIG. 8 shows registration data of the instruction information previously recorded in the storage part. When the instruction information 48 that coincides with this registration data is received, the function of the corresponding instruction content is executed.

In FIG. 8, instruction information RQK01 means the application executing instruction. For example, when RQK01 is received as the instruction information 48 in a case where the icon of the file FL001 displayed on the display screen is irradiated with the laser beam, it is so considered that processing intended to open the file designated by irradiation of the laser beam is performed by the user, and the corresponding application program is executed, for retrieval and display of this file FL001. When the key K1 is depressed, the information corresponding to this instruction information RQK01 is included in the laser beam and is outputted.

In addition, the RQK02 means the menu/list display instruction. When the RQK02 is received, the function item that can be used at present is displayed as a list on the display part. When the key K2 is depressed, the information corresponding to this instruction information RQK02 is included in the laser beam.

RQK03 and RQK04 mean an instruction to move a cursor displayed on the display part in an upper direction and in a lower direction. For example, when the key K3 is depressed, with the function item displayed as a list, RQK03 is transmitted from the laser pointer 4 as the instruction information 48. At this time, when RQK03 is received, it is so determined that the upper instruction input of the scroll is given for the function item list displayed as a list, and the cursor is moved in the upper direction by one item. When RQK04 is received, it is so determined that a lower scroll instruction is inputted by the key K4, and the cursor is moved in the lower direction by one item.

RQK05, 06, and 07 are the instruction information 48 received when the keys K5, K6, and K7 are depressed respectively, and when such instruction information is received, the function associated with each key in the pen input mode is executed.

FIG. 8 shows the instruction information and the instruction content corresponding to the keys (K1 to K7). However, such data is an example, and the present invention is not limited thereto.

For example, it is preferable to define the instruction information capable of responding to a state in which the key is depressed twice corresponding to double click of the mouse, and a state in which the key is depressed for a long time, and it is also preferable to define the instruction information of the function frequently used by the user, in association with the key operation.

<Explanation for an Outline of the Operation of an Example of this Invention>

Here, a file operation of a user in the presentation will be explained as an example. The file operation means the operation of selecting any one of the icons of a plurality of files displayed on the display screen and displaying content of the selected file on the display screen.

Figure 9:
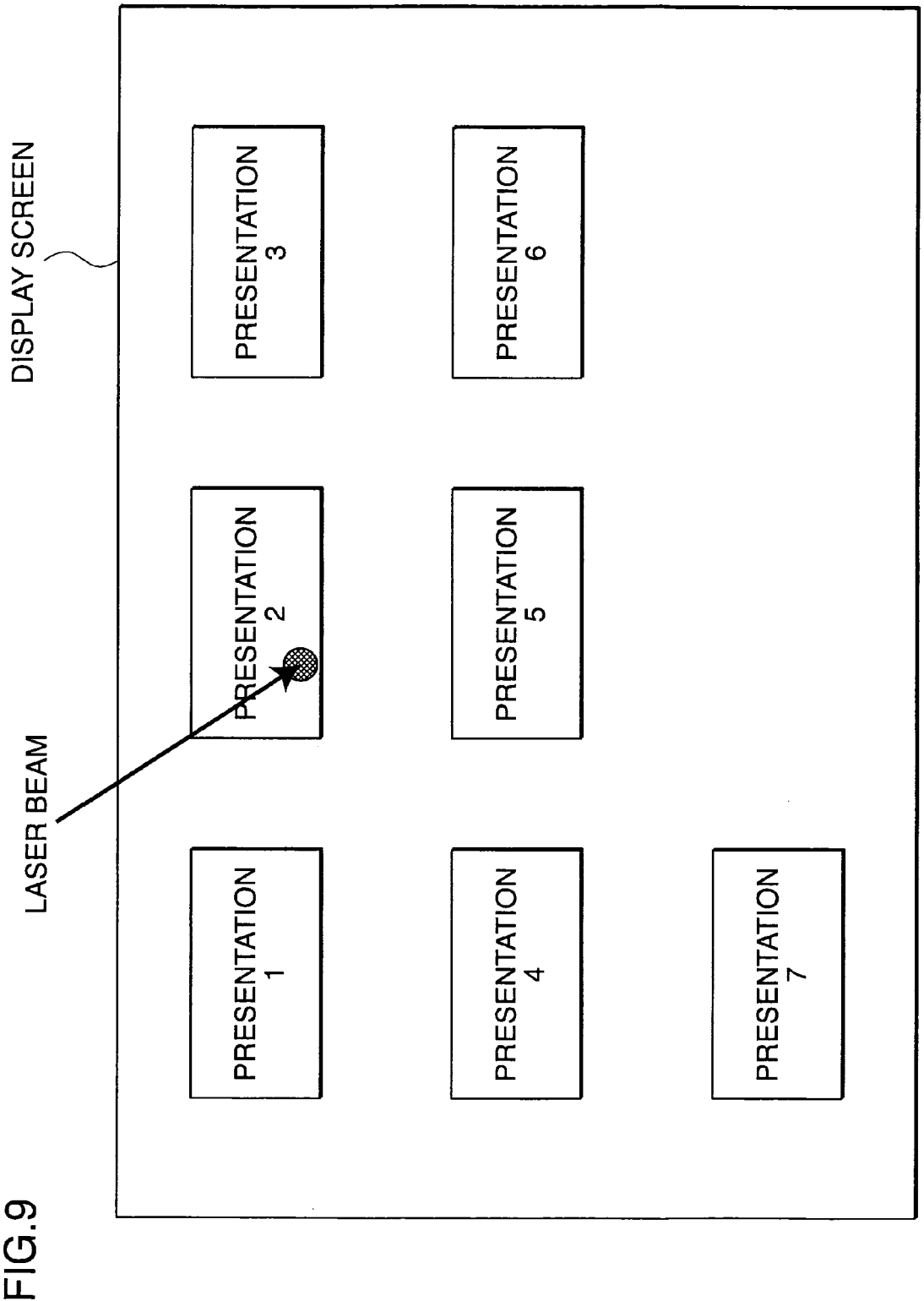
FIG. 9 is an explanatory view of icons displayed on a display screen according to an example of this invention.

FIG. 9 shows a state in which the icons (presentations 1 to 7) corresponding to seven files (presentation materials) are displayed on the display screen of the display part. The displayed icons are not limited to seven files, and may be displayed by the number of prepared materials (1 or a plurality of numbers).

In this state, a displayed position of each icon is previously defined and the optical sensors arranged at a position corresponding to the display area of one icon are also previously defined.

For example, when 100 optical sensors are assumed to be arranged at the position corresponding to the display area of the icon of the presentation 5, the file of the presentation 5 is selected by the laser pointer 4 when the laser beam is detected by any one of the optical sensors.

First, as shown in FIG. 2, the IC card 5 is approached to the laser pointer 4 by the user. With this operation, radio communication 6 is performed between the IC card 5 and the laser pointer 4, and the identification information RID47 stored in the IC card 5 is transmitted to the laser pointer 4, and is stored in the memory part 46.

Next, the user directs the laser output part 41 of the laser pointer 4 toward the display screen and depresses the laser output key K0.

With this operation, when the instruction input part 43 so recognizes that the output instruction of the laser beam is given, the information synthesizing part 42 reads the identification information RID47 from the memory part 46, and gives to the laser output part 41 an output signal including the identification information RID47 in the laser beam 7.

Thereafter, the laser beam 7 such as having the identification information RID47 superposed thereon is outputted from the laser output part 41.

When the display screen is irradiated with such a laser beam 7, the laser beam 7 is detected by the optical sensor at this irradiation position, and in this case, the electric signal as shown in FIG. 5B is outputted from the laser detection part 12.

The received information acquiring part 24 extracts the identification information RID47 from this electric signal, and stores it in the storage part 30.

The authentication part 25 compares the extracted identification information RID47 with the previously stored user identification MID34, and the authentication processing is performed. In this authentication processing, when both pieces of information (RID, MID) coincide with each other, it is so determined that the user authentication is a success, and processing thereafter is received. Meanwhile, when they do not coincide with each other, the processing corresponding to this instruction is not executed, even if the instruction information 48 is received thereafter.

After the user authentication succeeds, the user operates the laser pointer 4, while viewing the display screen, so that the icon of a desired file (such as presentation 2) is irradiated with the laser beam 7, and depresses the key K1 (execution key).

The operation of depressing the key K1 is an operation intended to display by the user on the display screen the content of the file displayed at the position irradiated with the laser beam. In a case of FIG. 9, this is an operation intended to display a file of the presentation 2.

With this operation, the information synthesizing part 42 reads from the memory part 46 the instruction information RQK01(48), and includes the instruction information RQK01(48) in the laser beam 7. Then, the laser beam 7 including the instruction information RQK01(48) is outputted from the laser output part 41. At this time, the identification information RID47 may be included in the laser beam, in addition to the instruction information RQK01.

When the display screen is irradiated with such a laser beam 7, the electric signal is outputted from the optical sensor at the irradiation position, which is then given to the position calculation part 23 and the received information acquiring part 24. The position calculation part 23 calculates, using the outputted electric signal, the X-coordinate and the Y-coordinate of the optical sensor that outputs the electric signal, and recognizes which place of the display screen is irradiated with the laser beam.

In addition, a positional relation between the position of the optical sensor and the display area of the icon is previously known, and therefore the position calculation part 23 recognizes that the position of the optical sensor that outputs the electric signal is included in which display area of the display area of the icon of the file displayed on the display screen.

Thus, the user recognizes to which file, the selection instruction is given.

Figure 10:
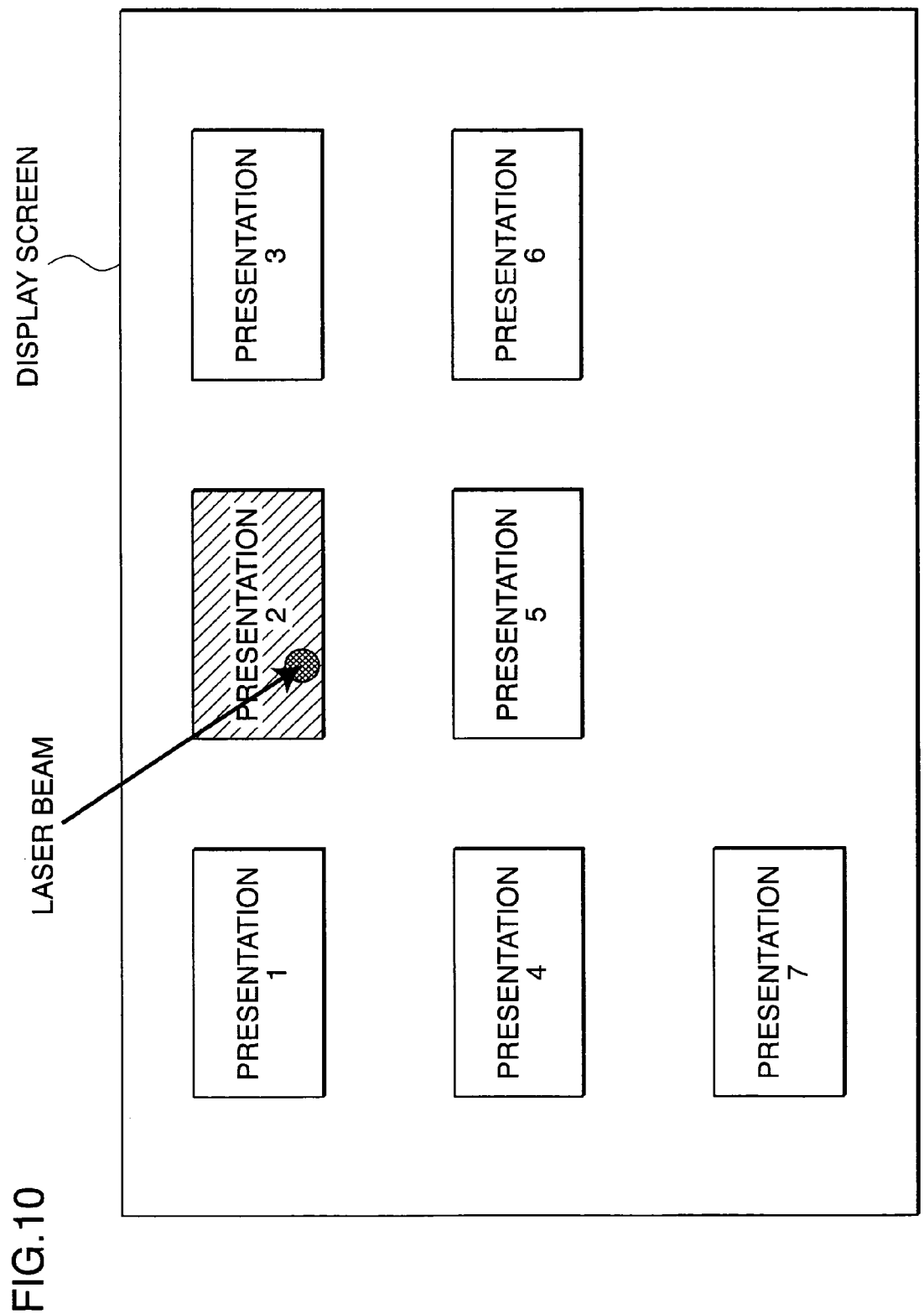
FIG. 10 is an explanatory view of the icons displayed on the display screen according to an example of this invention.

At this time, as shown in FIG. 10, in order to let the user know regarding the selection of the file, a part of a displayed icon (presentation 2) of the recognized file may be displayed with its color changed, or may be blink-displayed.

Meanwhile, the received information acquiring part 24 extracts the instruction information 48 (RQK01) included in the electric signal and confirms which instruction content shown in FIG. 8 coincides with this instruction information 48.

Here, if the received information acquiring part 24 so recognizes that RQK01 is received, it is so determined that the instruction input for executing application is performed.

Then, the file retrieval part 26 retrieves the file recognized from the irradiation position of the laser beam 7, and reads the file information. Thereafter, based on the application name APN in the read file information 31, the application executing part 27 activates the corresponding application program, and performs processing of displaying the read file on the display screen.

Figure 11:
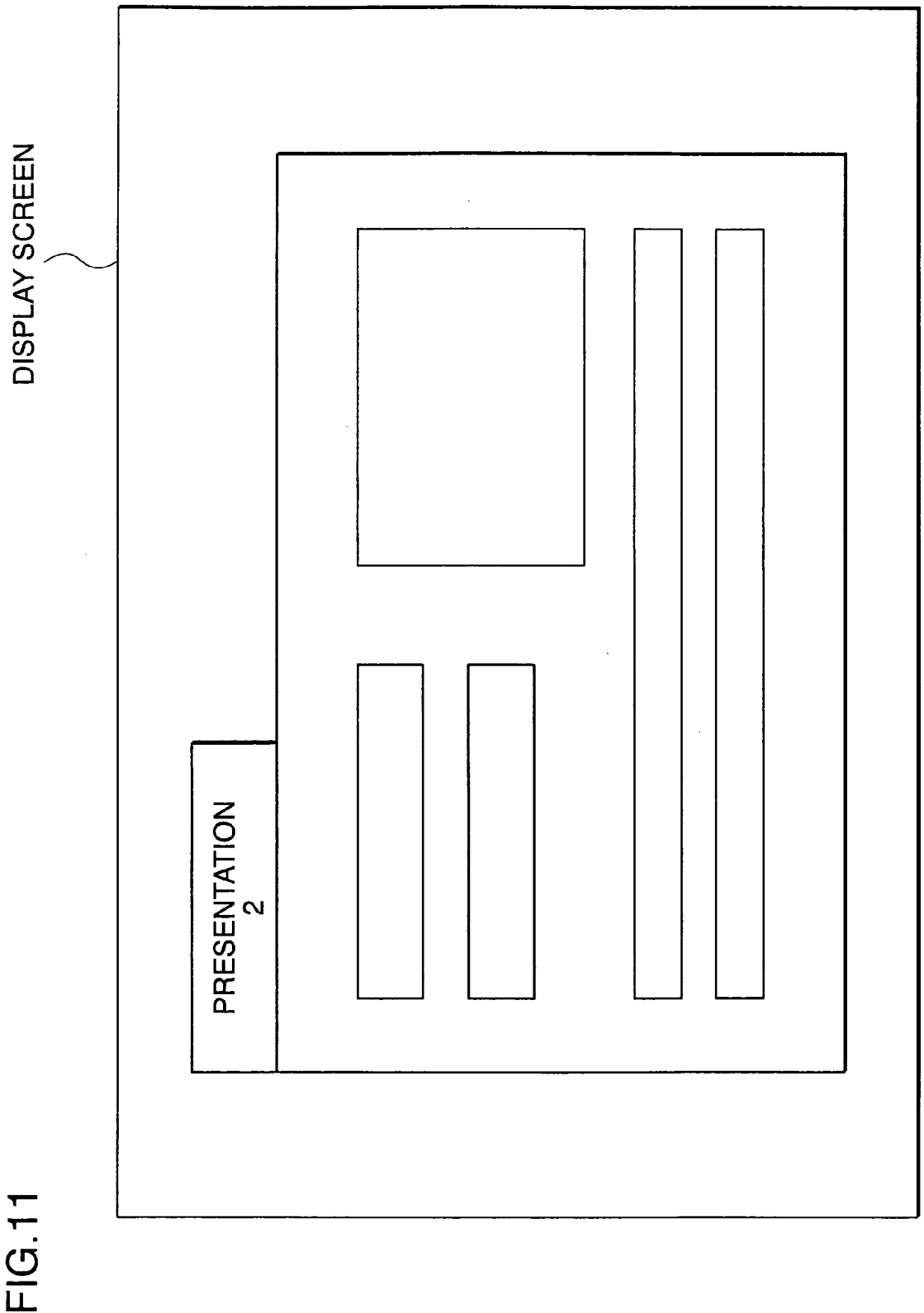
FIG. 11 is an explanatory view of a file content displayed on the display screen according to an example of this invention.

According to such a series of processing, as shown in FIG. 11, the file corresponding to the presentation 2 is displayed on the display screen.

EXAMPLE 1

Figure 12:
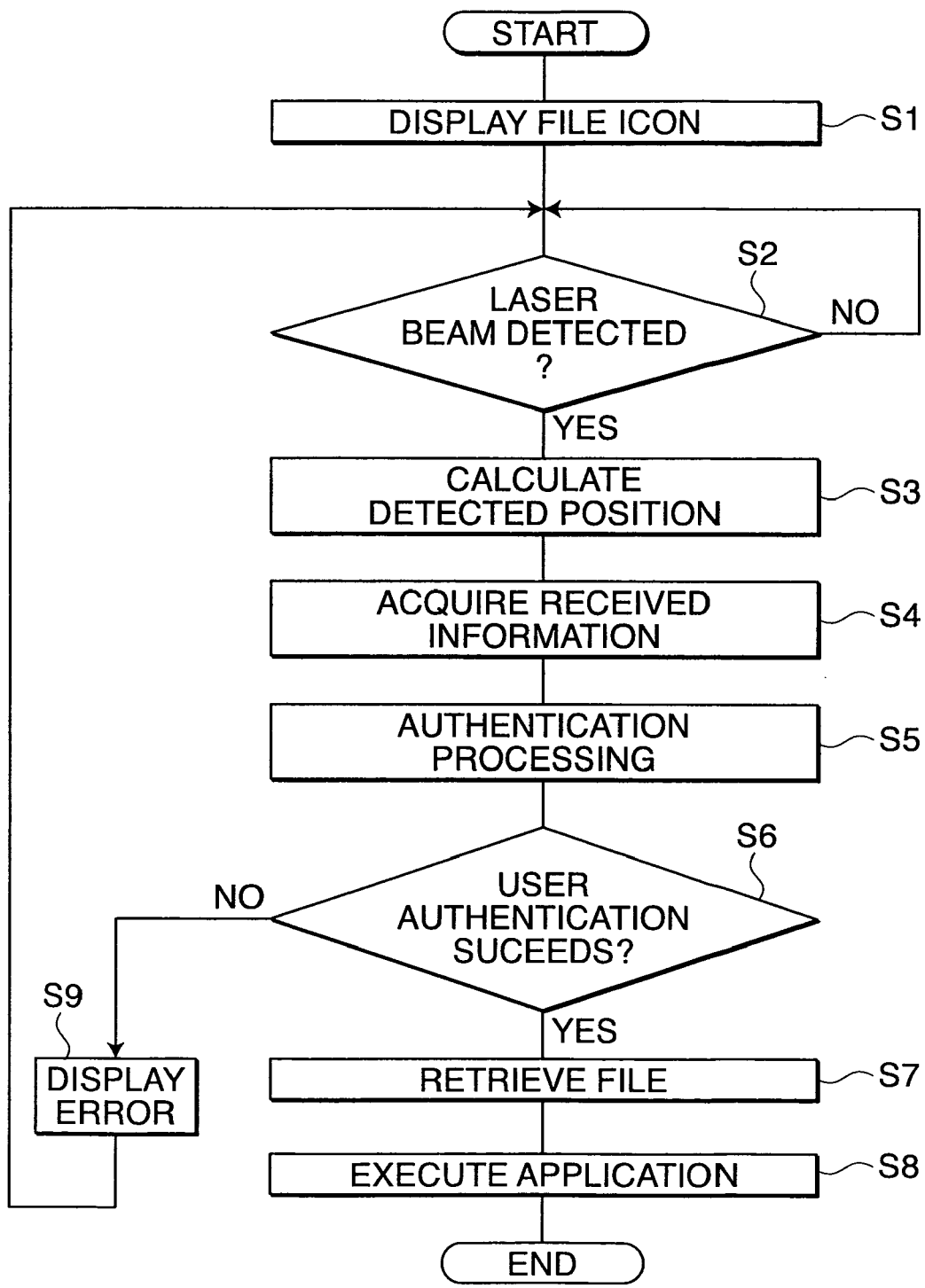
FIG. 12 is a first flowchart of display control processing according to an example 1 of this invention.

FIG. 12 shows a flowchart of display control processing of an example 1 of this invention.

This flowchart mainly shows a behavior of the display control device 2.

Here, explanation will be given for a case of performing processing of opening the file, when the user performs operation of selecting the file by the laser pointer 4 with icons of a plurality of files displayed as shown in FIG. 9.

First, in step S1, icon display of the file as shown in FIG. 9 is performed. Such a display of the icon of the file is performed, by reading icon information previously stored as display data 32 and generating information of a format that can be displayed on the display part 11 by the output information generation part 22, and giving thus generated information to the display part 11 by the display control part 21.

In step S2, in such a display state, whether or not the laser beam 7 from the laser pointer 4 is detected is checked. This can be performed by the position calculation part 23, depending on whether or not the electric signal is received from the optical sensor of the laser detection part 12 (sensor module).

The electric signal is outputted, when the surface of the display screen is irradiated with the laser beam 7, and the laser beam is detected by the optical sensor at this irradiation position. Therefore, in step S2, when there is the electric signal, processing proceeds to step S3, and when there is no electric signal, processing of step S2 is repeated.

The outputted electric signal is given to the position calculation part 23 and the received information acquiring part 24.

In step S3, the position calculation part 23 calculates the position of the detected optical sensor on the display screen with the received electric signal.

As described above, the position of the optical sensor is calculated, by confirming the electric signal (Sx, Sy) outputted from the optical sensors arranged in a matrix. Thus calculated position information is stored in the storage part 30, as the received information 36.

In step S4, the received information acquiring part 24 acquires the identification information, etc, included in the laser beam, by analyzing a component of the received electric signal.

For example, when a signal pattern corresponding to the previously defined identification information 47 exists in the received electric signal, this signal pattern is extracted and is stored in the storage part 30 as the received information 36.

In addition, when there is a signal pattern corresponding to prescribed instruction information 48, this signal pattern is extracted and is stored in the storage part 30 as the received information 36.

In step S5, the authentication processing for the user is performed with the received information 36. Here, whether or not the identification information RID47 of the user previously authorized to use the system is included in the received laser beam is checked.

Specifically, whether or not the received identification information RID47 is included in the user information MID34 of the storage part 30, or whether or not the user information MID34 and the received identification information RID47 coincide with each other is checked.

When they coincide with each other or when including the identification information RID47, such a case means the success of the user authentication, and processing proceeds to step S7 according to a determination in step S6.

Meanwhile, when they do not coincide with each other, or when not including the identification information RID47, such a case means failure of the user authentication, and processing proceeds to step S9.

In step S9, error display is made to the user, thereby showing impossibility of using this device, because the user authentication fails, and processing is returned to step S2.

In step S7, file retrieval processing is performed. Here, based on the position information calculated in step S3, the file retrieval part 26 recognizes the file associated with this position and reads from the storage part 30 the file information 31 regarding this file.

Although not shown in FIG. 7, the file name FN and coordinate data of an area on the display screen displaying the icon of this file are paired and this pair is stored in advance, and by finding the area in which the position coordinate of the detected optical sensor is included, the file name FN of the file corresponding to the position information can be recognized.

The file information 31 (FN, FID, APN, and file content) as shown in FIG. 7 is read by the file retrieval processing (step S7).

In step S8, processing such as activating application is executed, based on the read file information 31.

For example, if the information having the file name FN of "FN002" of FIG. 7 is read, the corresponding application program (APR-bbb) is activated, based on the application name APN (APR-bbb) included in this information.

Then, a target file (FL002) is opened by this application program, and is displayed on the display screen of the display part.

With the above-described processing, prescribed authentication processing is performed and selection and display processing of a desired file is executed, by the instructing operation of the user using the laser pointer. Namely, only by performing the instructing operation of the laser pointer 4, the user can easily display an intended file in consideration of security, while viewing the display screen.

In the above-described explanation, explanation has been given for an example of performing the processing of opening the file only by authorizing the user. However, the processing of opening the file may be executed, only in a case where a clear application executing instruction input is given by the user. Thus, it is possible to prevent the file from being opened only by the authentication operation of the user, for example only by giving the laser output instruction, although the file to be opened is not selected yet.

Here, input of the application executing instruction means the reception of the instruction information RQK01 by depressing the execution key K1 of the laser pointer 4.

Figure 13:
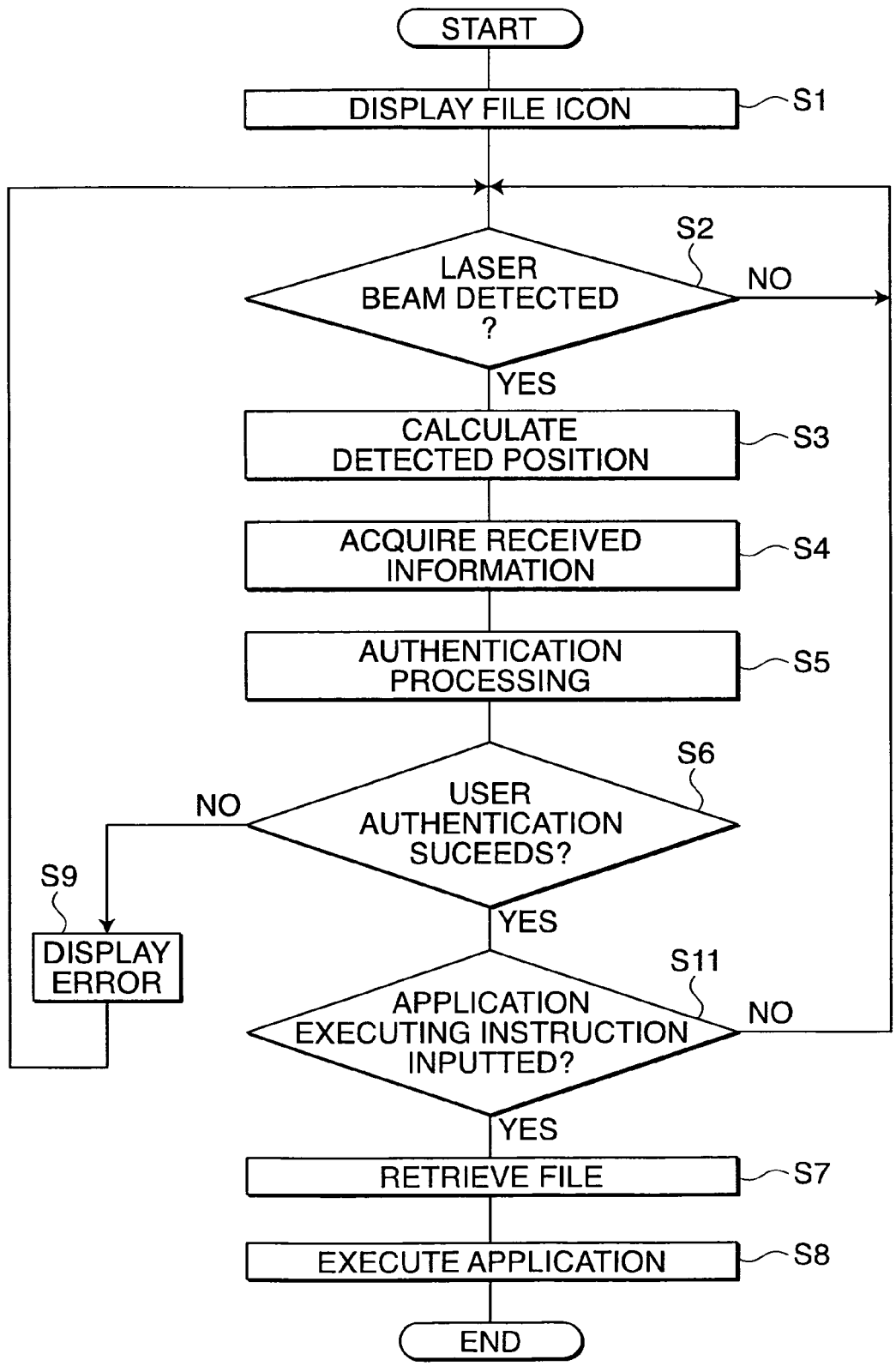
FIG. 13 is a second flowchart of the display control processing according to the example 1 of this invention.

FIG. 13 shows a flowchart in a case of confirming the application executing instruction input by the user according to an example 1.

In FIG. 13, the same step number is given to the same step of FIG. 12.

In FIG. 13, only different point from processing of FIG. 12 is the point that step S11 is added.

In step S11, whether or not the application executing instruction input is given is confirmed in step S11. In a case of confirming such an input, processing of steps S7 and S8 is executed, and in a case of not confirming such an input, processing is returned to step S2.

When the user depresses the execution key K1 of the laser pointer 4, the instruction information RQK01 corresponding thereto is read and the laser beam 7 including this instruction information 48 is outputted. When the laser beam 7 is detected by the optical sensors, in step S4, the received information acquiring part 24 acquires the instruction information 48 (RQK01) from this signal pattern, because the signal pattern corresponding to the instruction information 48 (RQK01) is included in the received electric signal.

Therefore, in step S11, thus acquired instruction information 48 confirms whether or not the acquired instruction information 48 is included in the information shown in FIG. 8. When the received instruction information 48 coincides with RQK01 in the information of FIG. 8, it is so determined that the application executing instruction is given.

As described above, by providing step S11, the application execution for opening the file is performed only when a clear user's intent to input is given. Accordingly, it is possible to prevent an erroneous operation of the user and therefore the operation load of the user is further reduced by giving a clear intent input, although an input operation of the execution key is required.

EXAMPLE 2

Here, explanation is given for a case where the authentication information FID35 for every file is given to the file information 31 stored in the storage part 3.

As shown in FIG. 7, when confidential information is included in the file, the authentication information FID35 is given, for every file, to limit the person authorized to open this file. For example, at a time of creating or storing the file, the ID of the person who creates this file is inputted, and the file information 31 is created with this ID defined as the authentication information FID35. Then, when the processing of opening the file is performed, input of the authentication information FID35 of this file is requested, and when there is no input that coincides with this information FID35, this file is left unopened.

However, when the requested input is manually inputted by the user every time the request is given, there is a problem that the load of the user is increased, thus inhibiting a smooth progress of the conference.

Therefore, in this invention, the input of the information that coincides with the authentication information FID35 is not performed by manual input, and by comparing the identification information RID47 sent in a state of being included in the laser beam with the authentication information FID35 given for every file, file authentication is regarded as a success when both information coincide with each other, and it is so determined that correct authentication information is inputted.

Namely, in an example 2, file authentication processing is not performed by manual input by the user, but automatically performed with the identification information RID47 sent in a state of being included in the laser beam.

Figure 14:
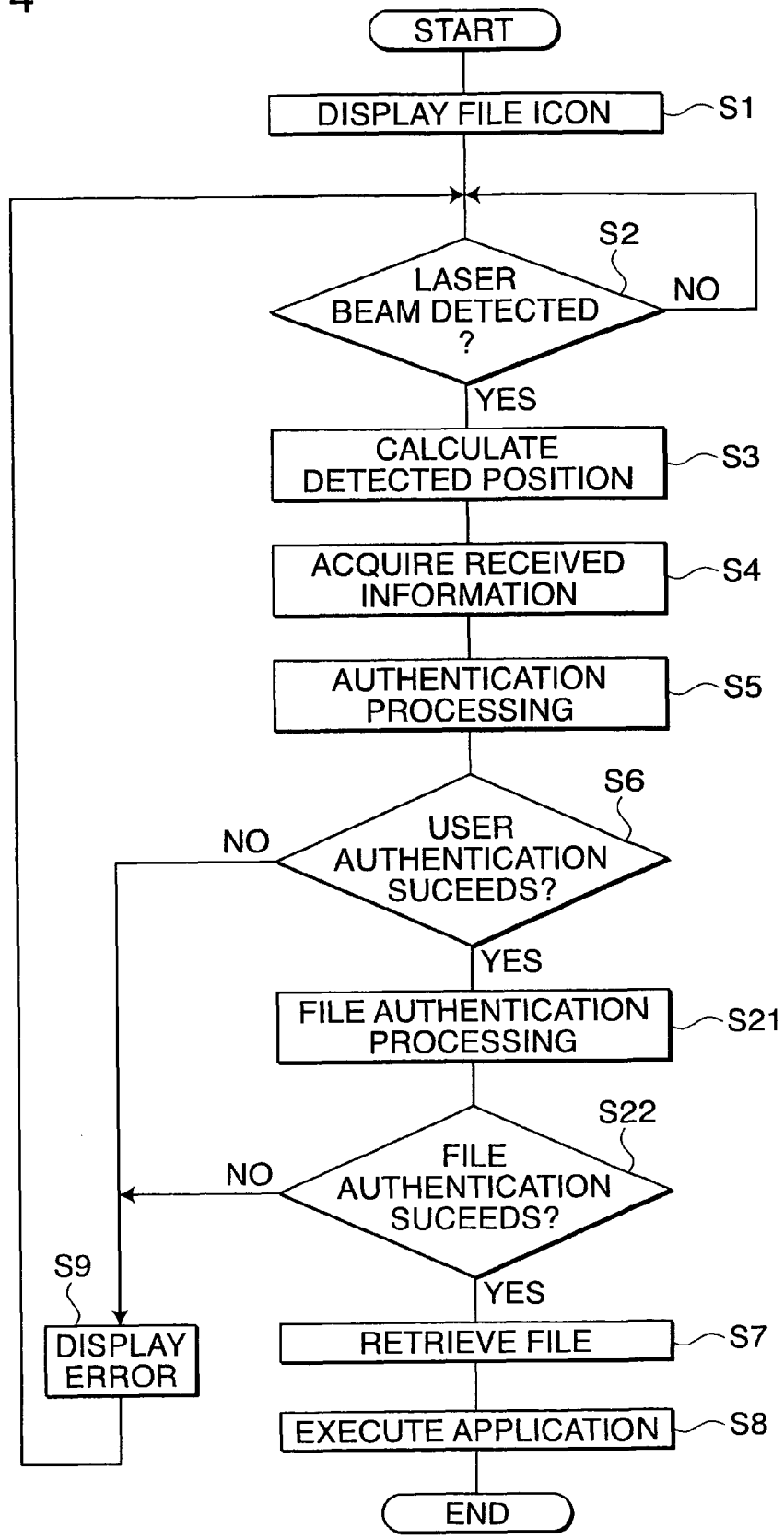
FIG. 14 is a flowchart of the display control processing of an example 2 of this invention.

FIG. 14 shows a flowchart of the display control processing according to the example 2 of this invention.

The same step number is given to the same processing content as FIG. 12.

In the flowchart of FIG. 14, the file authentication processing is performed in step S21, and in step 22, processing of determining whether or not the file authentication succeeds is different from a flow of FIG. 12.

In the file authentication processing in step S21, comparison is made between the identification information RID47 in the received information acquired in step S4 and the authentication information FID35 in the file information 31 of this file already stored at a time of creating the file. When both information (RID and FID) coincide with each other, it is so determined that the file authentication succeeds and the processing of opening this file is allowed to be performed, processing proceeds to step S7, and the processing of displaying this file on the display screen is performed.

Meanwhile, when both information (RID and FID) do not coincide with each other, the file authentication fails, and processing proceeds to step S9, and error display is made notifying that the file can not be opened.

By performing such a file authentication, leak of the confidential information is prevented for every file, and the security can be further improved.

In addition, the file authentication is not performed by a specific manual input operation by the user, but is performed as a result of operating the laser pointer by the user. Therefore, the operation load of the user can be reduced, and operability can be improved. Further, when the explanatory material displayed on the display screen is explained in the conference, the file authentication processing is performed together with a generally performed operation such as operation of the laser pointer. Therefore, the conference can be smoothly performed, without inhibiting the progress of the conference.

EXAMPLE 3

In the aforementioned example, explanation has been given for a case of performing file operation by the user, by displaying the icon of the file on the display screen. However, the icon displayed on the display screen is not limited to the icon corresponding to the file, and may be the icon corresponding to device connected to this display control device 2.

The device refers to peripheral equipment such as a client personal computer (PC), NAS (Network Attached Storage), an image forming apparatus MFP, and a printer, connected via a network such as a LAN.

Figure 15:
FIG. 15 is an explanatory view of device information according to an example of this invention.

FIG. 15 shows an example of device information, corresponding to the file information 31. In this example, the device information of the device selected by indicating the displayed icon by the laser pointer is read out of plural device information, and activation of the device corresponding to this device information and display of a set screen and an operation screen for operating the device are performed.

Figure 16:
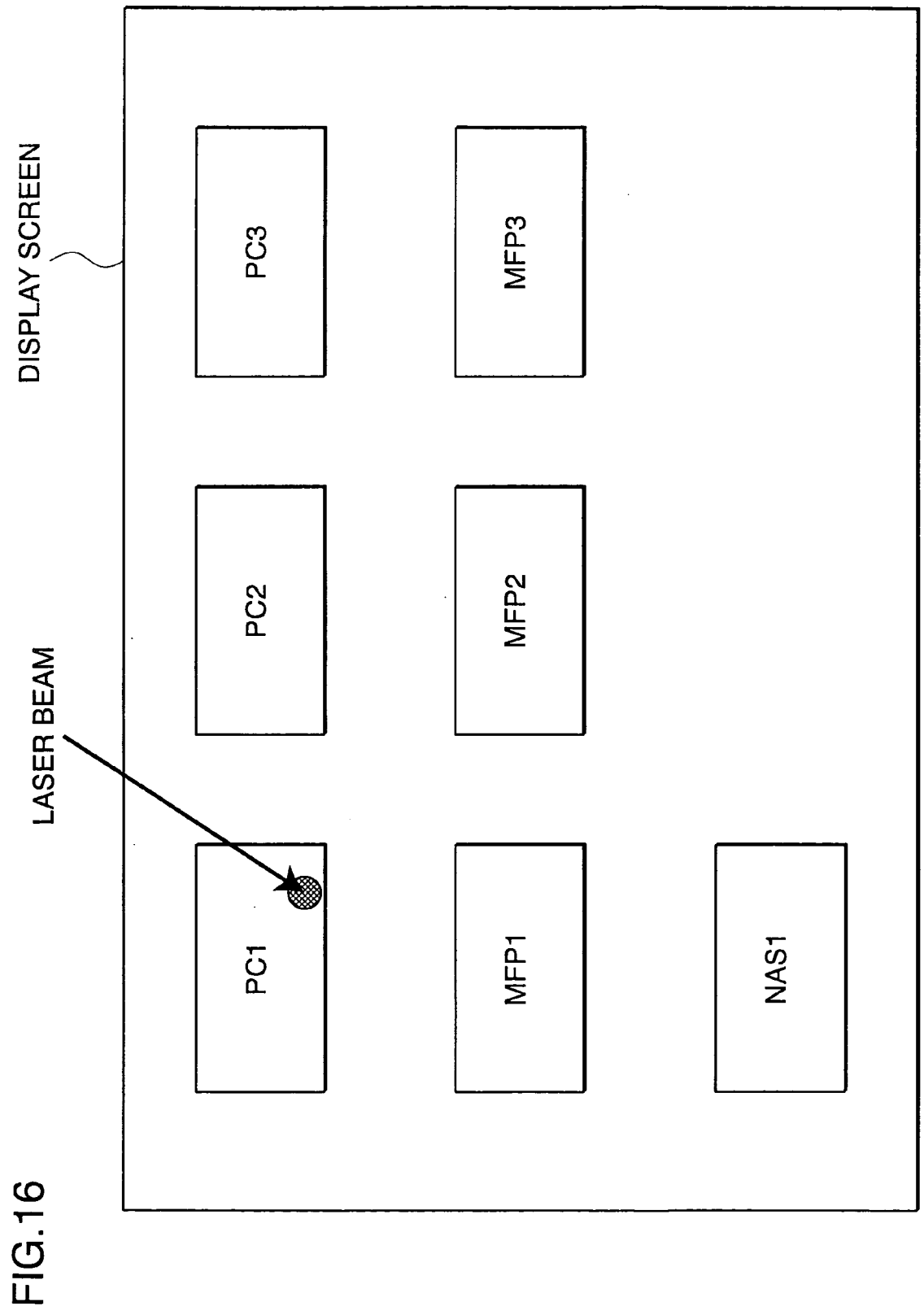
FIG. 16 is an explanatory view of the icons displayed on the display screen according to an example of this invention.

FIG. 16 shows an explanatory view of an example of displaying the icon of the device on the display screen.

Similarly to the file operation shown in FIG. 9, by selecting and operating the icon of any one of the displayed icons by the user using the laser pointer 4, a desired device is selected.

FIG. 16 shows a state where the personal computer PC1 is selected by the laser pointer 4. As a flow of this example 3, the same flow as shown in any one of FIG. 12 to FIG. 14 can be used.

Namely, by performing operation of indicating the icon of any one of the devices by the user using the laser pointer 4, the identification information RID47 is transmitted in a state of being included in the laser beam, and therefore the user authentication (step S5) is performed. Only when the user authentication succeeds, processing for the device thereafter is executed.

In addition, when the instruction information 48 meaning executing application is included in the laser beam, processing for the selected device, for example the processing of displaying the operation screen of this device is performed. For example, when the personal computer and NAS are indicated as the device, the information regarding the file and folder stored in the personal computer is displayed on the display screen, and further a state accessible to the displayed file, etc, is made with the laser pointer.

Further, when the selected device is the MFP, the set screen such as a print instruction is displayed, and further with the laser pointer, detailed setting of a print item is made with the laser pointer.

As described above, only by performing instruction input by the laser pointer, the user can easily perform user authentication and the instruction input to a plurality of devices while viewing the display screen, thus making it possible to reduce the operation load of the user.

Moreover, the application program can also be used as an object associated with the displayed icon. Namely, when there is a plurality of application programs used by the user, the icon corresponding to these application programs are displayed on the display screen as shown in FIG. 9, and by performing instruction input operation of any one of the displayed icons by the laser pointer 4, the user may select the application to be activated.

In addition, by previously setting the authentication information 35 for every application program, only the user having the identification information RID47 that coincides with this authentication information 35 can use the application program.

In this case also, only by performing instructing operation by the laser pointer 4, the user can easily perform the user authentication processing and selection and activating processing of the application program.

EXAMPLE 4

Here, explanation will be given for an example of additional writing of characters and figures by the user using the laser pointer, so as to be superposed on display content of the file, etc, displayed on the display screen.

The keys K5, K6, and K7 formed in the laser pointer 4 are used to give write instruction of characters, etc. Written characters, etc, are expressed as a gathering of a plurality of dot images displayed at the irradiation position of the laser pointer.

For example, when the key K5 is depressed, the instruction information 48 (RQK05) of "black pen mode switching instruction", which means writing of the characters, etc, by a black pen, is included in the laser beam 7 to output the laser beam including the instruction information 48 (RQK05). Also, when the key K6 is depressed, the instruction information 48 (RQK06) of "red pen mode switching instruction" is included in the laser beam to output the laser beam including the instruction information 48 (RQK06). When input of such black color or red color mode switching instruction is recognized, then, a black or red dot image is displayed at a position of the display screen indicated by the laser pointer 4. When the file, etc, is already displayed on the display screen, the dot image is synthesized into this file, and is displayed. Namely, the dot image is additionally displayed on the display screen.

Further, when the spot of the laser point 4 is moved, the dot image is further displayed with the already displayed dot image stay as it is. Namely, a photolithographic image (such as a straight line) including a plurality of dot images is displayed up to a position to which the laser pointer 4 is moved. Thus, desired characters and figures can be added to the already displayed image and can be displayed.

In addition, when the key K7 is depressed, all dot images drawn theretofore are deleted. Alternately, only the dot image at a position indicated by the laser pointer 4 at present may be deleted. When the key K7 is depressed, the laser beam is outputted with the instruction information 48 (RQK07) of "pen mode release instruction" included in the laser beam.

Figure 17:
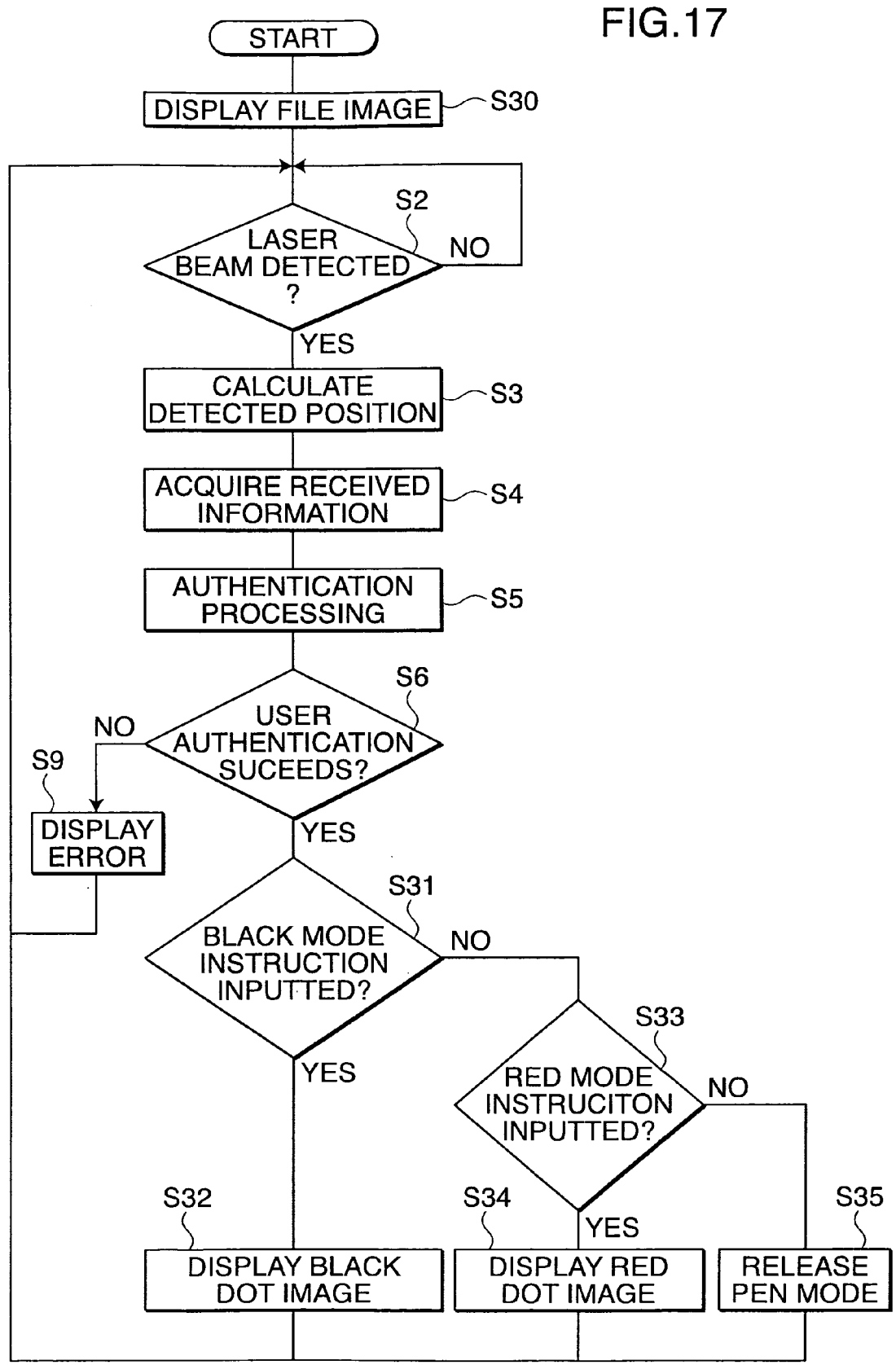
FIG. 17 is a flowchart of mode switching processing according to an example 4 of this invention.

FIG. 17 shows a flowchart of an example of the mode switch processing of an example 4.

Here, the same step number is given to the same processing as the flow shown in FIG. 12. Processing from step S30 to S35 is different processing from the processing of FIG. 12.

First, in step S30, the image such as file is displayed on the display screen.

Although not indispensable, processing of step S30 is performed to show that some sort of image is displayed, for explaining for processing of writing characters, etc, over the already displayed image. For example, in the display screen of the icon of the file of FIG. 9, if the icon is selected with the laser pointer, the image as shown in FIG. 11 is displayed on the display screen.

Thereafter, it is so assumed that the user moves the laser beam outputted from the laser pointer 4 to a prescribed position (PTa) on the display screen, and when the prescribed position PTa is irradiated with the laser beam, the mode switching key (K5 or K6) of the laser pointer is depressed. Namely, it is assumed that in order to display the dot image at the prescribed position PTa, the user makes instruction input (depression of the key) intentionally.

For example, when the instruction input part 43 recognizes the depression of the key K5, the instruction information 48 corresponding to the key K5 is read from the memory part 46. Here, the instruction information 48 of the "black pen mode switching instruction (RQK05)" is read.

Then, the information synthesizing part 42 sends to the laser output part 41 the output signal showing that the instruction information 48 (RQK05) is included in the laser beam 7. The laser output part 41 outputs the laser beam 7 on which the instruction information 48 (RQK05) is superposed. However, in order to improve the security, preferably the identification information RID47 of the user is included in the laser beam so that not only the instruction information 48 but also the electric signal as shown in FIG. 5C is outputted.

The outputted laser beam 7 is detected by the laser detection part 12. In this case, the laser beam including the identification information 47 and the instruction information (RQK05) is detected by the optical sensor at a position corresponding to the aforementioned prescribed position PTa, and the corresponding electric signal is sent to the position calculation part 23 and the received information acquiring part 24.

Thus, in step S2, when the laser beam is detected, similarly to the processing of FIG. 12, detected position calculation processing (step S3), received information acquisition processing (step S4), and authentication processing (step S5) are performed.

In the authentication processing, whether or not the received identification information RID47 and the user information MID34 coincide with each other is checked, and in step S6, when they coincide with each other, it is so determined that the user authentication succeeds, and processing proceeds to step S31.

When the user authentication fails, processing proceeds to step S9, and a failure of the user authentication is displayed to let the user know about this failure.

In step S31, whether or not the instruction information 48 acquired by the received information acquiring part 24 is the black mode switching instruction input (RQK05) is checked.

When the black mode switching instruction (RQK05) is received, processing proceeds to step S32, and the display of the black dot image is made.

Here, the black dot image is synthesized into the already displayed image and is displayed at the aforementioned prescribed position PTa which is obtained in the detected position calculation processing. Thereafter, processing is returned to step S2, and the next instruction input is awaited.

In addition, in step S33, when the acquired instruction information 48 is determined to be the red mode switching instruction (RQK06), processing proceeds to step S34, and the display of the red dot image is performed. Thereafter, processing is returned to step S2.

In addition, in step S33, when the acquired instruction information 48 is the pen mode release instruction (RQK07), processing proceeds to step S35, and pen mode release processing is performed.

In the pen mode release processing, only the dot image displayed at the prescribed position PTa calculated in step S3 is deleted, out of the already displayed dot images. Alternately, all of the already displayed dot images may be deleted. In addition, when the key K7 is double-clicked and the pen mode release instruction (RQK07) is received twice or more continuously within a prescribed time, all of the dot images may be deleted.

A flow of FIG. 17 shows a case of determining only three pieces of instruction information 48 regarding writing in steps S31 and S33, for explanation. However, the present invention is not limited thereto, and in step S31, by determining which one of all pieces of the instruction information 48 (RQK01 to 07) is received, and processing corresponding to each instruction information 48 received thereafter may be performed.

In addition, when the irradiation position of the laser beam is moved, while depressing the key K05 of the laser pointer 4, the black dot image is displayed at a position corresponding to a locus of the laser beam. Thereafter, when depression of the key K05 is stopped, the display of the dot image is stopped.

Thus, characters, symbols, or figures can be displayed by the user, so as to be overlapped on the image already displayed on the display screen.

Alternately, it may also be preferable that the black dot image is displayed as a moving locus of the laser beam, not while depressing the key K05 but after depressing the key K05 once, and writing of the dot image is determined to be stopped when the key K07 is depressed, and the black dot image is not displayed even if the laser beam is emitted thereafter.

In this example 4, the laser beam is outputted in a state of including the instruction information and the identification information corresponding to a key input operation. Therefore, only by performing an input operation of a specific key attached to the laser pointer 4, write processing of characters, etc, on the display screen can be easily performed in addition to the user authentication.

Note that when the write processing is performed, first, the user authentication processing (steps S5 and S6) is performed once, and when the authentication succeeds, the authentication processing in steps S5 and S6 may be omitted in the write processing thereafter, without performing the authentication processing every time the dot image is displayed.

EXAMPLE 5

Here, explanation will be given for an example in which a holding state of the laser pointer 4 by the user is detected, and when a non-holding state is changed to the holding state, communication between the IC card and the laser pointer is executed, and the laser pointer 4 acquires the identification information RID stored in the IC card 5.

In the example shown in FIG. 2, when the IC card 5 is approached to the laser pointer 4, the identification information RID47 is transmitted to the laser pointer 4, and is stored in the memory part 46 of the laser pointer. Thereafter, the authentication processing is performed with this stored identification information RID47 included in the laser beam 7.

However, if a chance of acquiring the identification information RID47 from the IC card is only when the IC card is approached to the laser pointer 4, the identification information RID47 can not be acquired or erroneous identification information is acquired in some cases. If the erroneous identification information RID47 is acquired, unintended authentication processing is performed with the erroneous identification information RID.

Accordingly, when the unintended authentication processing succeeds, the file that normally can not be referenced by the user of the laser pointer is sometimes displayed, and a sufficient security can not be ensured in some cases. Therefore, in order not to acquire the erroneous identification information RID47 from the IC card as much as possible, it is preferable to increase the chance of acquiring the identification information RID47.

Herein, as the chance of acquiring the identification information RID47, the time when the user holds the laser pointer, namely, the time when the hand of the user touches on the laser pointer is used. Namely, a holding state detection part is formed in the laser pointer 4 for detecting existence/non-existence of the holding state of the laser pointer by the user. Then, when change of the holding state is detected, from a state A showing a non-contact state in which the hand of the user does not touch on the laser pointer, to a state B showing a contact state in which the hand of the user touches on the laser pointer, the communication part 45 transmits to the IC card 5, a transmission request of the identification information RID47.

The IC card 5 that receives this transmission request transmits to the laser pointer 4, the identification information RID stored in the storage part 52.

The holding state detection part is constituted of a conductive material such as a conductive metal that forms a casing of the laser pointer 4, and a detection circuit for detecting a weak radio wave that exists around a human body when a part of the human body (such as a hand) touches on the conductive material. The detection circuit is connected to the conductive material.

When the user holds the laser pointer 4 by hand, and touches on the conductive material on an outer peripheral surface, the weak radio wave that exists around the human body is transmitted to the conductive material via the hand of the human body. This weak radio wave is sent to the detection circuit from the conductive material.

In the detection circuit, when a magnitude of an amplification signal is a threshold value or more which is previously defined for a specific time period or more after the weak radio wave is amplified, this case is determined to be a state B in which the user holds the laser pointer 4.

Reversely, when the aforementioned amplification signal of a specific magnitude is not detected for a specific time period or more, this case is determined to be a state A in which the user does not hold the laser pointer 4.

Thus, when the identification information RID47 is acquired from the IC card, even when the change of the holding state is detected, from the state A in which the user does not hold the laser pointer, to the state B in which the user holds the laser pointer, the chance of acquiring the identification information RID is increased, and acquisition of erroneous identification information RID can be reduced.

Accordingly, by preventing the acquisition of the erroneous identification information RID, it is possible to prevent the display of the file that can not be normally referenced by the user of the laser pointer, thus making it possible to improve the security.

EXAMPLE 6

Here, explanation will be given for an example in which a vibration element is formed in the laser pointer, for letting only the user of the laser pointer know about impossibility to acquire the identification information RID of the IC card.

The identification information RID of the IC card is important information used in the authentication processing, and therefore must be surely transmitted to the laser pointer.

In an example 5, when the user holds the laser pointer by hand, the identification information RID47 is acquired from the IC card. However, when the communication between the laser pointer and the IC card fails and the identification information RID can not be acquired by the laser pointer, a notification of not acquiring the identification information RID must be reported to the user. For example, it can be considered that a buzzer is sounded, or a notification of requesting re-input is reported to the user with voice because the authentication information can not be acquired.

However, such a notification with voice is also notified to, for example, the participants of the conference, and therefore a smooth progress of the conference is inhibited. Accordingly, in order not to inhibit the smooth progress of the conference, it is preferable to perform notification that is not known to the person excluding the user of the laser pointer.

Therefore, the vibration element is formed in the laser pointer. Then, when the communication part 45 can not acquire the identification information RID by communicating with the IC card, the vibration element is vibrated, and acquisition error of the identification information 47 is notified only to the user of the laser pointer.

With the vibration of the vibration element, the user who knows the acquisition error of the identification information 47 lets the hand off from the laser pointer to place it on a desk once, without completely interrupting the explanation of the presentation, and grips the laser pointer once again. With this operation, the communication between the laser pointer and the IC card as shown in the example 5 is performed, and the acquisition of the identification information RID47 is performed again.

When the identification information RID47 is normally acquired by such a retransmission of the identification information RID47, the user can smoothly make the presentation proceed thereafter without being largely interrupted.

Note that as the vibration element, the one conventionally used in information equipment such as a cellular phone, etc, may be used.

According to the present invention, the laser beams are outputted, with the output information included in the laser beams emitted to the display screen. Therefore, the user can easily perform display control only by operating the laser emitting device that emits laser beams while viewing the display screen. Therefore, the operation load of the user can be more reduced than that of the system in which operation is performed for the display control in addition to the irradiation operation of the laser beams. This makes it possible to improve the operability of the user in the conference, etc, and a smooth progress of the conference, etc, can be realized.

What is claimed is:

1. A display system comprising a display device, a display control device and a laser emitting device,
   the display device including:
   a display part that displays information on a display screen; and
   a laser detection part having a plurality of optical sensors arranged in the vicinity of the display screen of the display part to detect a laser beam that has reached the display screen,
   the laser emitting device including:
   an instruction input part that inputs an instruction with respect to the displayed information, and
   a laser output part that outputs the laser beam including output information corresponding to the inputted instruction; and
   the display control device including:
   a position calculation part that calculates a position of the display screen irradiated with the laser beam based on positions of the optical sensors that have detected the laser beam,
   a received information acquiring part that acquires the output information included in the laser beam detected by the optical sensors, and
   a display control part that controls a display of the information displayed on the display part, based on the position calculated by the position calculation part and the acquired output information,
   wherein the instruction input part includes a plurality of keys, and the output information included in the laser beam is instruction information corresponding to a function associated with each key, and when any one of the keys is depressed, the laser output part outputs the laser beam including the instruction information associated with the depressed key;
   wherein the instruction information included in the laser beam is pen mode switch instruction information for additionally displaying a desired dot image on a display screen, and the display control part displays the dot image at an irradiation position of the laser beam on a display screen of the display part, when the received information acquiring part acquires pen mode switching instruction information from the laser beam including the instruction information;

wherein, when the instruction information included in the laser beam is the pen mode release instruction information for deleting an added dot image, the display control part deletes the dot image additionally displayed on the display screen.

2. The display system according to claim 1, further comprising:

an IC card that stores identification information RID in advance for identifying a user, the laser emitting device including a communication part that reads the identification information RID stored in the IC card by performing communication with the IC card, wherein the identification information RID read from the IC card is used in the output information included in the laser beam.

3. The display system according to claim 2, wherein the IC card is a non-contact type card that performs radio communication with the communication part.

4. The display system according to claim 1, wherein the output information includes identification information for identifying a user and instruction information corresponding to instruction content inputted by the instruction input part, the display control device further includes:

a storage part that previously stores user information for specifying a person authorized to use the display system, an authentication part that performs authentication of the user by comparing the identification information for specifying the user out of the output information acquired by the received information acquiring part with the previously stored user information, and the display control part controls a display of the information displayed on a display part based on a position calculated by the position calculation part and the instruction information out of the acquired output information.

5. The display system according to claim 1, wherein when the laser beam is emitted from the laser output part toward a specific icon, in a state of displaying the icon associated with one or a plurality of operation objects, after the laser beam is detected by optical sensors arranged at a position corresponding to a display area of the specific icon, the operation object corresponding to the icon irradiated with the laser beam from the position of the optical sensors calculated by the position calculation part is recognized, instruction content for this operation object is recognized from the output information acquired by the received information acquiring part, and the display control part performs display control of the recognized operation object based on the recognized instruction content.

6. The display system according to claim 5, wherein the operation object is any one of a file in which information is stored, a device, or an application program.

7. The display system according to claim 2, wherein the laser emitting device further includes a holding state detection part for detecting whether or not this laser emitting device is held by a user, and when a change of a holding state is detected by the holding state detection part from a non-holding state to a holding state, the communication part transmits to an IC card a transmission request of the identification information RID for identifying a user stored in the IC card.

8. The display system according to claim 2 or 7, wherein the laser emitting device further includes a vibration element, and when the identification information RID stored in the IC card can not be acquired by communicating with the IC card, the vibration element is vibrated.

* * * * *